US012558735B2

(12) United States Patent
Hazui et al.

(10) Patent No.: US 12,558,735 B2
(45) Date of Patent: Feb. 24, 2026

(54) WELDING CONTROL DEVICE, WELDING CONTROL METHOD, AND WELDING CONTROL PROGRAM

(71) Applicant: MITSUBISHI HEAVY INDUSTRIES, LTD., Tokyo (JP)

(72) Inventors: Yusuke Hazui, Tokyo (JP); Koki Tateishi, Tokyo (JP); Naoki Suda, Tokyo (JP); Kazuhiko Kamo, Tokyo (JP); Masahiro Kimura, Tokyo (JP); Yusuke Sano, Tokyo (JP); Yasushi Nishijima, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 921 days.

(21) Appl. No.: 17/439,654

(22) PCT Filed: Feb. 12, 2020

(86) PCT No.: PCT/JP2020/005231
§ 371 (c)(1),
(2) Date: Sep. 15, 2021

(87) PCT Pub. No.: WO2020/225950
PCT Pub. Date: Nov. 12, 2020

(65) Prior Publication Data
US 2022/0152720 A1     May 19, 2022

(30) Foreign Application Priority Data
May 8, 2019     (JP) .................................. 2019-088001

(51) Int. Cl.
B23K 9/095     (2006.01)
G06N 20/00     (2019.01)
G06T 7/73     (2017.01)

(52) U.S. Cl.
CPC .......... B23K 9/0953 (2013.01); B23K 9/0956 (2013.01); G06T 7/73 (2017.01);
(Continued)

(58) Field of Classification Search
CPC . G06T 2207/20081; G06T 2207/30108; G06T 7/73; B23K 9/0953; B23K 9/0956; G06N 20/00
(Continued)

(56) References Cited

U.S. PATENT DOCUMENTS 6,362,456 B1     3/2002 Ludewig et al.
2009/0179021 A1*     7/2009 Nishimura ........... B23K 9/1272
                                                                        219/136
(Continued)

FOREIGN PATENT DOCUMENTS

DE     10 2008 038 332     1/2009
JP     3-193270     8/1991
(Continued)

OTHER PUBLICATIONS

Machine Translation of JP2018138309A (Year: 2024).*
(Continued)

*Primary Examiner* — Edward F Landrum
*Assistant Examiner* — Thomas J Ward
(74) *Attorney, Agent, or Firm* — Wenderoth, Lind & Ponack, L.L.P.

(57)     ABSTRACT

A welding control device configured to control a position control object which includes at least one of a welding wire used to weld a welding object or an electrode for melting the welding wire includes a first decision unit for deciding an actual position of the position control object based on a welding feature amount detected from an image which is shot to include at least the position control object, a second decision unit for deciding a target position which is a target
(Continued)

of the actual position according to an input condition based on the input condition which includes at least one of attitude information of the electrode when the welding object is welded or shape information of the welding object, and a control unit for performing position control of the position control object so that the actual position becomes the target position.

17 Claims, 13 Drawing Sheets

(52) U.S. Cl.
CPC .... *G06N 20/00* (2019.01); *G06T 2207/20081* (2013.01); *G06T 2207/30108* (2013.01)

(58) Field of Classification Search
USPC ........................................................ 219/124
See application file for complete search history.

(56) References Cited

U.S. PATENT DOCUMENTS

| | | | | |
|---|---|---|---|---|
| 2015/0076119 A1* | 3/2015 | Hsu | ..................... | B23K 9/0953 |
| | | | | 219/74 |
| 2021/0114131 A1 | 4/2021 | Hazui et al. | | |

FOREIGN PATENT DOCUMENTS

| | | | | |
|---|---|---|---|---|
| JP | 2000-024777 | 1/2000 | | |
| JP | 2000-301340 | 10/2000 | | |
| JP | 2005-81419 | 3/2005 | | |
| JP | 2009-166076 | 7/2009 | | |
| JP | 2017148841 A * | 8/2017 | ............. | B23K 31/00 |
| JP | 2018-138309 | 9/2018 | | |
| JP | 2018138309 A * | 9/2018 | .............. | B23K 9/12 |
| JP | 2019-188437 | 10/2019 | | |

OTHER PUBLICATIONS

Machine Translation of JP2017148841A (Year: 204).*
Extended European Search Report issued Apr. 8, 2022, in corresponding European Patent Application No. 20802435.6.
International Search Report issued Apr. 21, 2020 in corresponding International Application No. PCT/JP2020/005231.
International Preliminary Report on Patentability issued Nov. 18, 2021 in corresponding International Application No. PCT/JP2020/005231, with English translation.
Office Action dated Mar. 14, 2024 in corresponding EP Application No. 20802435.6.

* cited by examiner

FIG. 1A
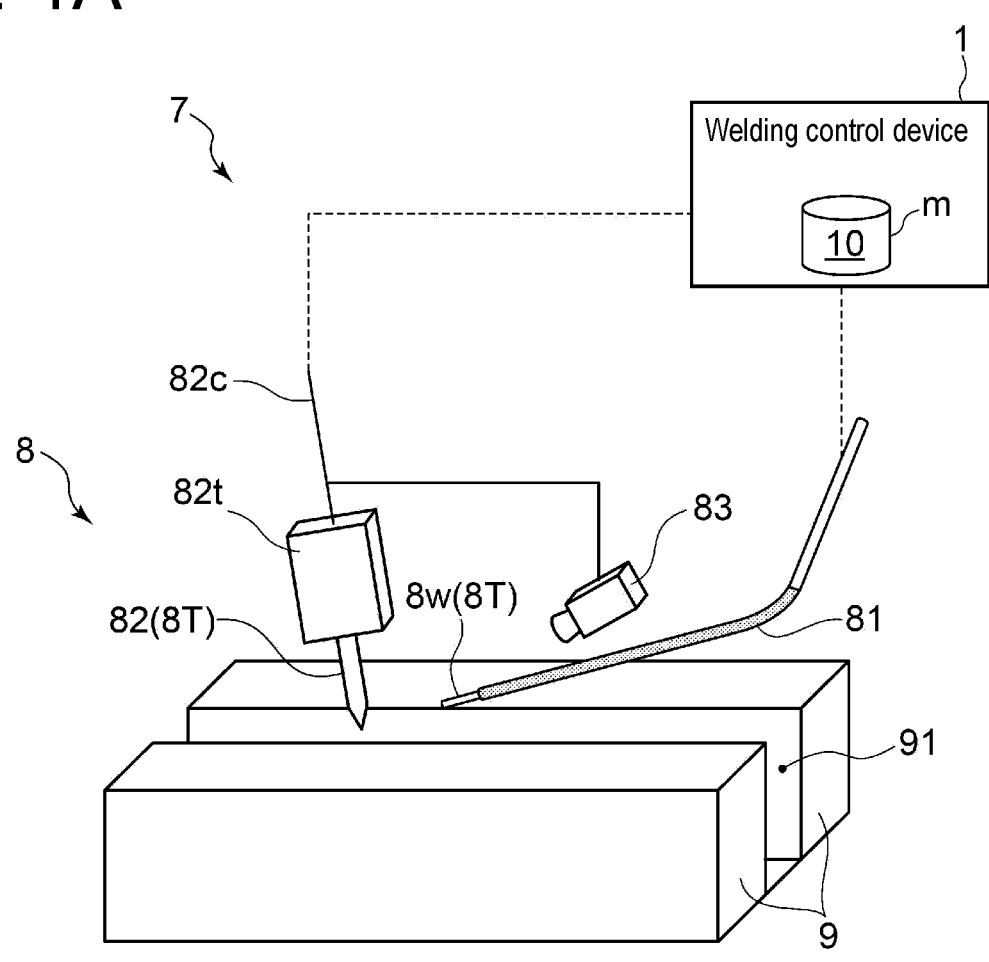
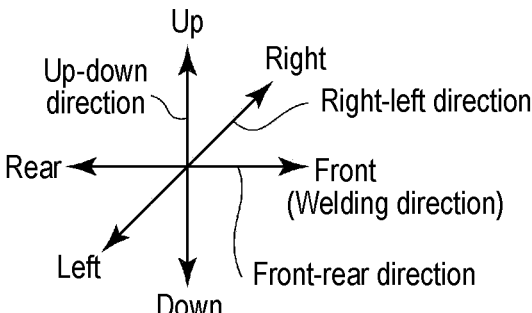

FIG. 1B
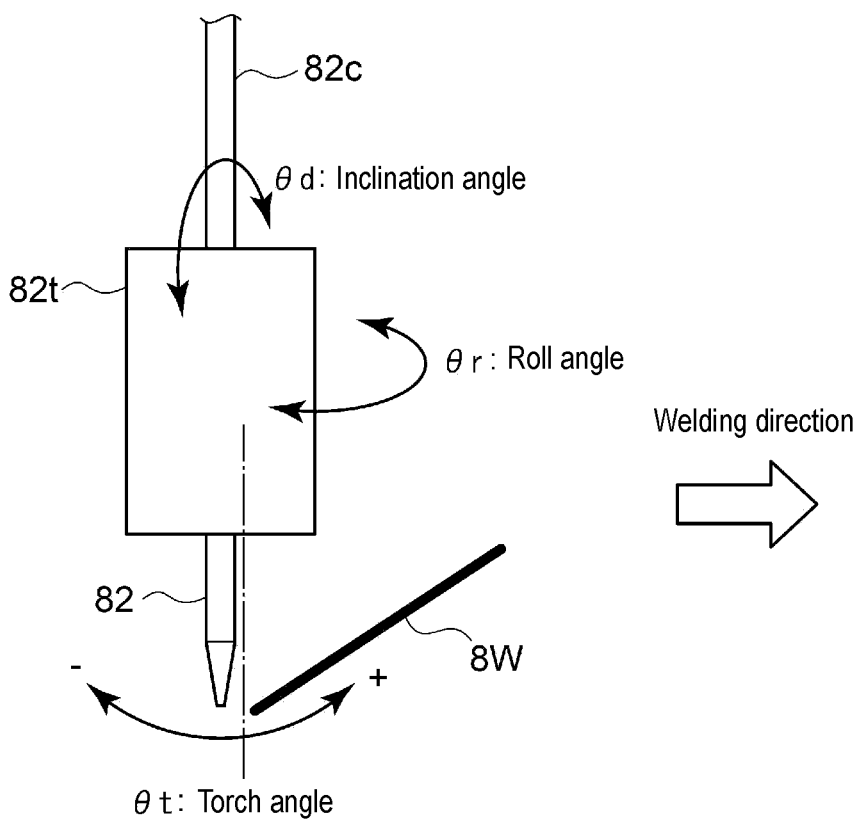
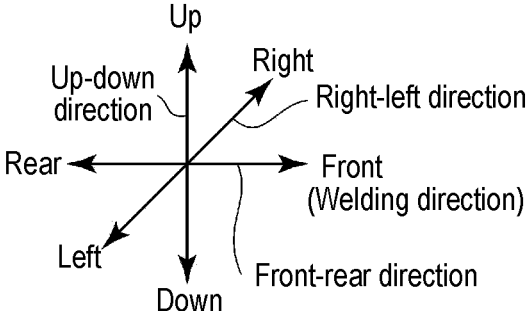

FIG. 2
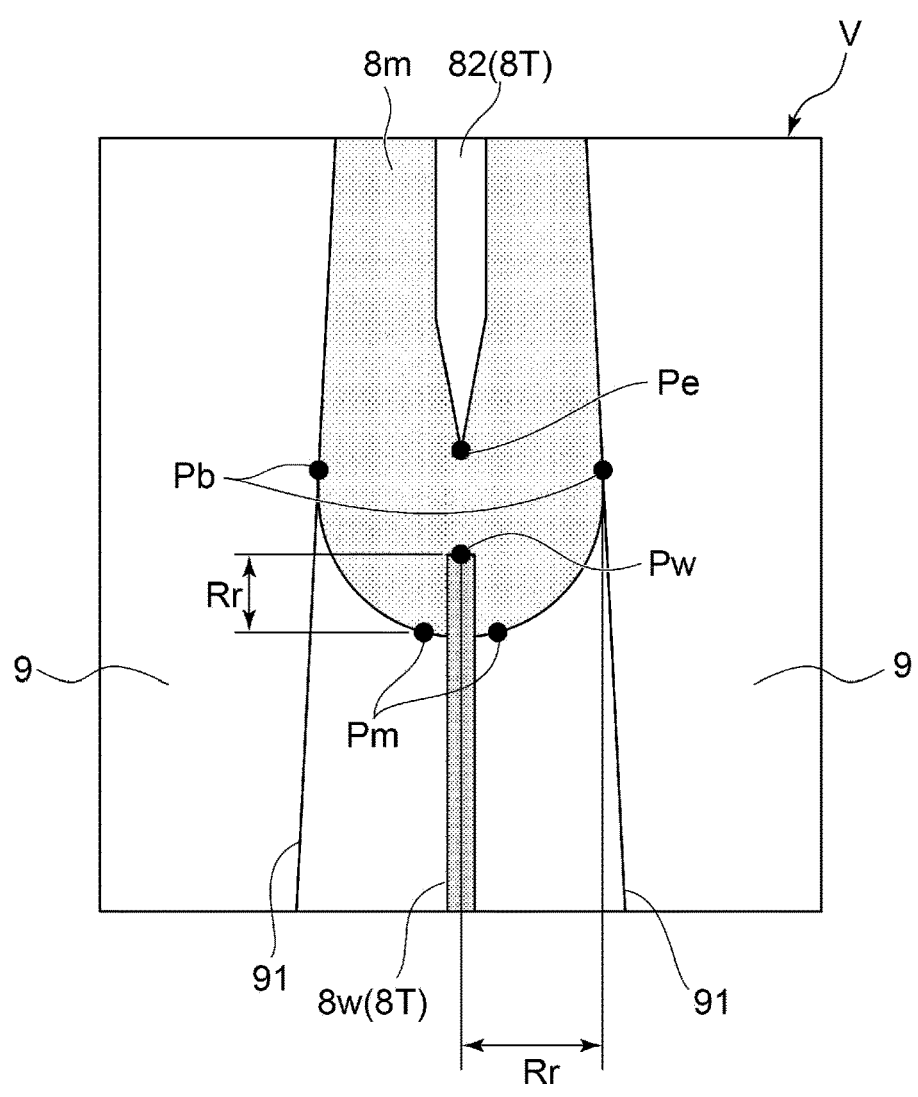
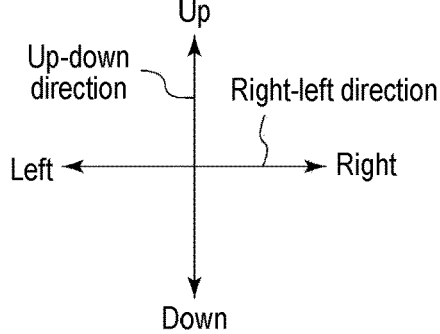

FIG. 3A

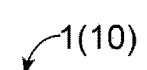

(Shooting part 83)

(Input condition C)

V   2

Actual relative position decision unit 21

First acquisition unit

V   22

Detection unit

First correction unit — 22c

P

First determination unit   23

(Notification)

P

Calculation unit   24

Rr

P

C   3

Target relative position decision unit

Second acquisition unit   3a

C   3b(32)

Third decision unit ← M   m

Rt

Second correction unit   6

Rt(Rt´)

Second determination unit   4

Rt,Rr(Rr´)   5

Control unit (Welding execution device 8)

Figure 3B:
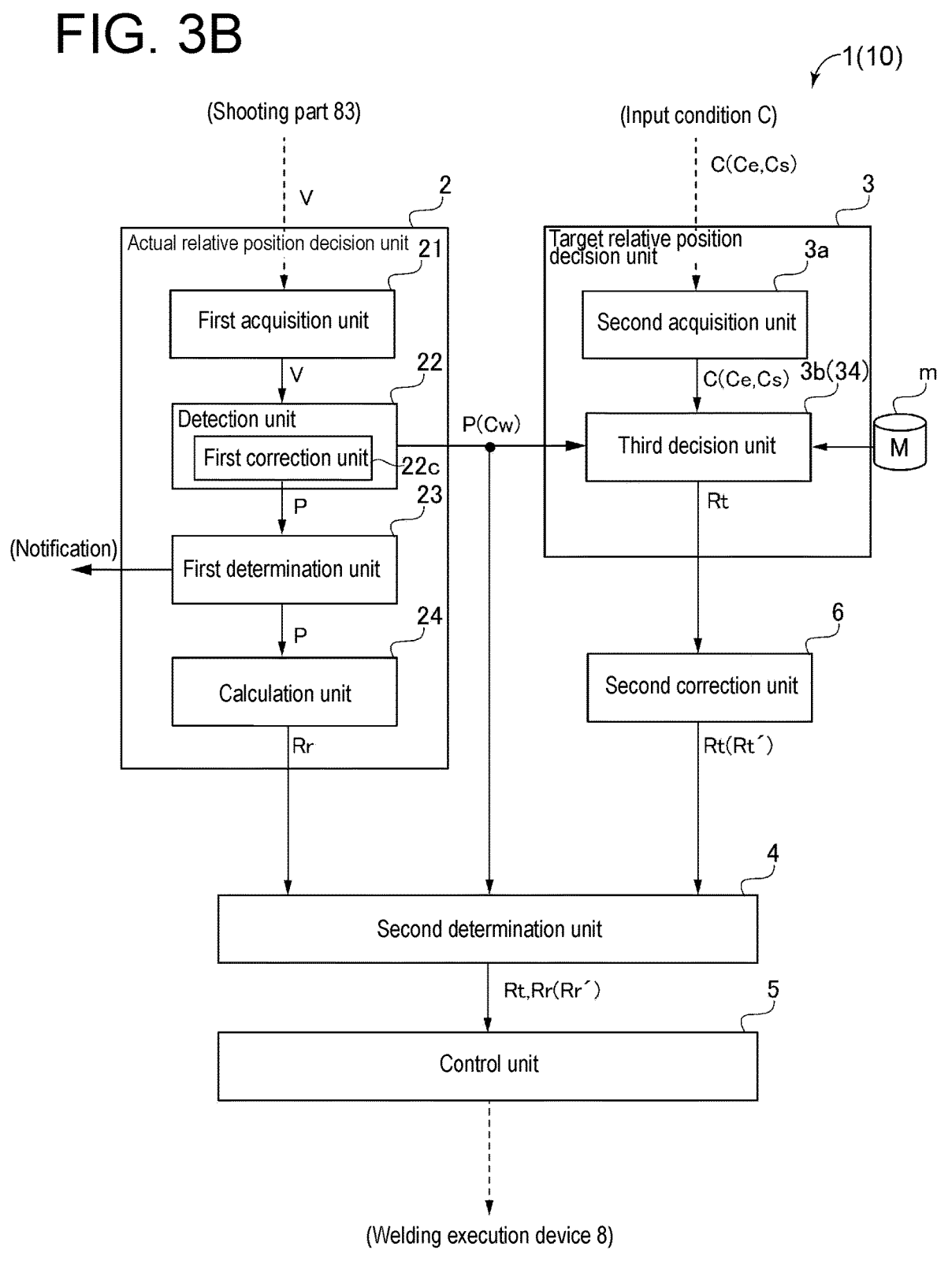

(Shooting part 83)                    (Input condition C)

C(Ce,Cs)

V                                     2

Actual relative position decision unit 21

First acquisition unit

V                                     22

Detection unit

First correction unit — 22c

P                                     23

(Notification) ← First determination unit

P                                     24

Calculation unit

Rr

Target relative position decision unit 3

3a

Second acquisition unit

C(Ce,Cs) 3b(34)        m

P(Cw)

Third decision unit ← M

Rt

6

Second correction unit

Rt(Rt′)

4

Second determination unit

Rt,Rr(Rr′)        5

Control unit

(Welding execution device 8)

FIG. 6
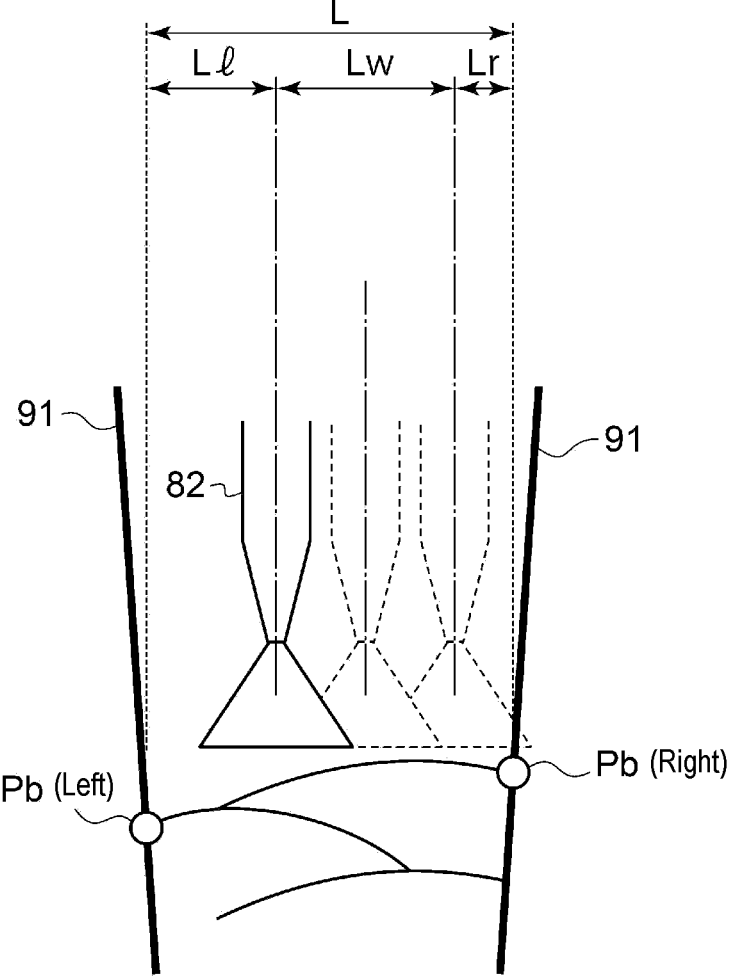
(In right pass procedure)
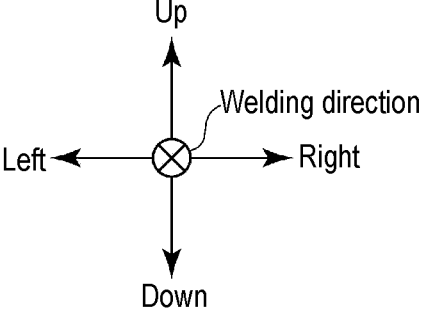

WELDING CONTROL DEVICE, WELDING CONTROL METHOD, AND WELDING CONTROL PROGRAM

TECHNICAL FIELD

The present disclosure relates to welding control to automate arc welding.

BACKGROUND

In automatic arc welding executed by using a non-consumable electrode while continuously supplying a welding wire to a molten pool, it is necessary to appropriately maintain a relative position of the electrode to a groove (wall surface) of a welding object, and a relative position of a position where the welding wire is inserted into the molten pool to the electrode and the molten pool. For example, if it is necessary to ensure a high welding quality such as in a case of a welded portion of a nuclear power plant, a welder monitors an automatic welding procedure directly or through an image shot with a camera and if the welding wire and the electrode are deviated from proper positions, the welder performs an intervention operation to adjust the deviation. Then, if it is possible to automatically perform such monitor adjustment operation by the welder, it is possible to achieve a reduction in dependency on a skill of the welder, such as an unmanned welding operation.

As a technique for automating the above-described monitor adjustment operation, Patent Document 1 is given as an example. Patent Document 1 discloses recognizing relative positions of an electrode, a welding wire, a groove, and a molten pool from a welding image shot by a camera, obtaining a deviation amount relative to a target position for each of the relative positions, and performing position control of a position control object such as the electrode or the welding wire so that the deviation amount becomes zero. Moreover, Patent Document 2 discloses deciding a target position of a position control object in accordance with welding conditions (a wire supply amount, a welding speed, a welding current, and the like).

CITATION LIST

Patent Literature

Patent Document 1: JP2018-138309A
Patent Document 2: JP2018-083950A

SUMMARY

Technical Problem

For example, if a welding object is complicated or if welding is executed while avoiding interference with an obstacle, arc welding is executed while changing the attitude of an electrode by using a welding execution device capable of controlling the attitude of the electrode with multiple axes (multiple joints). Then, the present inventors have found, through an intensive analysis of welding by a skilled welder, that an appropriate target position of a position control object such as the electrode can change in accordance with the attitude of the electrode and a shape of the welding object. Thus, the present inventors consider that it is possible to improve a welding quality of arc welding by deciding the target position of the position control object in accordance with the attitude of the electrode and the shape of the welding object in welding.

In view of the above, an object of at least one embodiment of the present invention is to provide a welding control device for controlling a welding procedure for the welding object in accordance with the attitude of the electrode and the shape of the welding object.

Solution to Problem (1) A welding control device according to at least one embodiment of the present invention is a welding control device configured to control a position control object which includes at least one of a welding wire used to weld a welding object or an electrode for melting the welding wire, the device including a first decision unit configured to decide an actual position of the position control object based on a welding feature amount detected from an image which is shot to include at least the position control object, the welding feature amount including at least one of a wire position of the welding wire or an electrode position of the electrode, a second decision unit configured to decide a target position which is a target of the actual position according to an input condition based on the input condition which includes at least one of attitude information of the electrode when the welding object is welded or shape information of the welding object, and a control unit configured to perform position control of the position control object so that the actual position becomes the target position.

With the above configuration (1), the welding control device decides the target position of the position control object, such as the welding wire or the electrode, in accordance with the input condition including the attitude information of the electrode or the shape information (such as the groove width) of the welding object. Then, the welding control device controls the welding execution device such that the actual position of the position control object which is obtained through the image processing on the image shot during welding coincides with the target position. The actual position of the position control object is a relative position of a position (absolute position) in a coordinate system set in the image, or the position of the welding wire (wire position) or the position of the electrode (electrode position) which is the position of the position control object to another welding feature amount (such as a molten pool position or a groove position to be described later). Thus, it is possible to automatically execute arc welding with the same welding quality as a case where arc welding is executed by a welder, and it is possible to implement automatic welding reduced in dependency on a skill of the welder.

(2) In some embodiments, in the above configuration (1), the image further includes at least one of a groove of the welding object or a molten pool formed in the groove by melting the welding wire, the welding feature amount further includes at least one of a groove position of the groove or a molten pool position of the molten pool, the actual position includes an actual relative position which is a relative position of at least one of the wire position or the electrode position to the another welding feature amount, and the target position includes a target relative position which is a target of the relative position according to the input condition when the welding object is welded.

With the above configuration (2), the welding control device decides, in accordance with the input condition, the target of the relative position (target relative position) of any two included in the welding feature amounts, such as the relative position of the welding wire to the molten pool, the relative position of the electrode to the groove, the relative position of the electrode to the welding wire. Then, the welding control device controls the welding execution device such that the actual relative position, where a welding situation by the welding execution device is obtained through image processing on the image, becomes the target. Thus, it is possible to automatically execute arc welding with the same welding quality as the case where arc welding is executed by the welder.

(3) In some embodiments, in the above configurations (1) and (2), the second decision unit includes a second acquisition unit configured to acquire the input condition, and a decision unit configured to decide the target position according to the input condition based on a relationship between a previous input condition in previous welding and a previous position which is the actual position set under the previous input condition.

With the above configuration (3), a correspondence relationship between a record of the absolute position of the position control object, or the actual position which is, for example, the relative position of any two of the welding feature amounts such as the relative position of the electrode to the groove, the relative position of the welding wire to the molten pool, or the relative position of the electrode to the welding wire, and the input condition at the time is accumulated for learning (for example, machine learning), and the target position according to the input condition in welding is obtained by using the learning result. Thus, it is possible to appropriately decide the target position of the position control object. Further, using the thus decided target position for position control, it is possible to implement the same welding quality as the case where welding is executed by the welder.

(4) In some embodiments, in the above configuration (3), the decision unit decides the target position according to the input condition by using a learning model which is obtained by machine learning of a plurality of data associating the previous input condition with the previous position set under the previous input condition.

With the above configuration (4), using the learning model created through the machine learning, it is possible to appropriately decide, from the input condition, the target position of the position control object according thereto.

(5) In some embodiments, in the above configuration (4), the input condition further includes a welding condition when the welding object is welded, the learning model includes a first learning model for obtaining a temporary target position according to the welding condition, and a second learning model for obtaining a correction amount for correcting the temporary target position according to at least one of the attitude information of the electrode or the shape information of the welding object, and the third decision unit decides the target position based on the temporary target position and the correction amount.

With the above configuration (5), using not less than two learning models created through the machine learning, it is possible to appropriately decide, from the input condition, the target position of the position control object according thereto.

(6) In some embodiments, in the above configurations (1) to (5), the attitude information includes information on at least one of a torch angle, an inclination angle, or a roll angle for setting an attitude of the electrode.

With the above configuration (6), setting the information on the at least one of the torch angle (forward angle, backward angle), the inclination angle, or the roll angle to the input condition, it is possible to appropriately decide the target position of the position control object according to the input condition.

(7) In some embodiments, in the above configurations (1) to (6), the position control object includes the electrode, the shape information of the welding object includes a groove width of the welding object, and the second decision unit decides the target position of the electrode based on at least the groove width.

The present inventors have found that the skilled welder operates the welding execution device such that the target position is optimized in accordance with the shape of the welding object, such as the relative position of the electrode to the groove position is changed in accordance with the groove width.

With the above configuration (7), the target position of the electrode is decided based on the width of the groove (groove width). Thus, it is possible to appropriately perform position control of the electrode which is the position control object in accordance with the groove width.

(8) In some embodiments, in the above configuration (7), the second decision unit estimates the groove width based on the image and a weaving width of the electrode, and decides the target position of the electrode based on the estimated groove width.

The groove width of the welding object may constantly change during welding. Thus, if weaving welding is executed, it may be difficult to acquire the groove width during welding, such as depending on brightness of the image, it may be possible to detect only the groove position of the groove on a side approached by weaving. More specifically, arc light serving as a light source cannot reach a far-side groove if the groove width is wide, and due to a decrease in brightness of the groove, it may be possible to detect only the groove position of the groove on the side approached by weaving.

With the above configuration (8), the groove width is estimated based on the image and the weaving width of the electrode. Thus, based on the estimated value of the groove width, it is possible to appropriately decide the target position of the position control object.

(9) In some embodiments, in the above configurations (1) to (8), the first decision unit includes a first correction unit configured to correct the welding feature amount based on the attitude information of the electrode, and decides the actual position based on the corrected welding feature amount.

If the shooting part for shooting the image is installed in the control mechanism for controlling the attitude of the electrode, the shooting direction to shoot the welding object may be changed in accordance with attitude control of the electrode. In this case, the change in attitude changes the way the shooting object such as the position control object or the welding object represented in the image is reflected (seen), which may deviate the welding feature amount, such as the groove position of the groove obtained as the result of image processing, from the appropriate position which is supposed to be detected. Then, the target position, which is decided based on the welding feature amount where the above-described deviation is caused, has low correlation with respect to the input condition. If such target position is used for control, accuracy of position control of the position control object such as the electrode may be decreased.

With the configuration (9), if the shooting direction to shoot the welding object by the shooting part for shooting the image is set in accordance with the attitude of the electrode, the welding feature amount is corrected based on the attitude information of the electrode. Thus, it is possible to perform position control of the position control object more accurately by using the more appropriate welding feature amount.

(10) In some embodiments, in the above configuration (9), the image further includes a groove of the welding object, the welding feature amount further includes a groove position of the groove, a shooting part for shooting the image sets a shooting direction to shoot the welding object in accordance with an attitude of the electrode, and the first decision unit corrects the groove position based on the attitude information of the electrode, and decides the actual position based on the welding feature amount including the corrected groove position.

With the configuration (10), if the shooting direction to shoot the welding object by the shooting part for shooting the image is set in accordance with the attitude of the electrode, the groove position which is the welding feature amount is corrected based on the attitude information (such as the roll angle) of the electrode. Thus, it is possible to perform position control of the position control object by using the more appropriate groove position.

(11) In some embodiments, in the above configuration (10), the attitude information includes a roll angle for setting the attitude of the electrode, and the first correction unit corrects the groove position detected from the image, based on a relation of $x=y\times\tan(\theta r)$, where $\theta r$ is the roll angle, $y$ is a length along a welding direction between a predetermined position and the groove position detected from the image, and $x$ is a length in a direction orthogonal to the welding direction between the predetermined position and the groove position detected from the image.

With the configuration (11), it is possible to appropriately correct the groove position which is the welding feature amount based on the attitude information (such as the roll angle) of the electrode.

(12) In some embodiments, in the above configurations (1) to (11), the input condition further includes a welding condition when the welding object is welded.

The present inventors have found that in automatic arc welding, a heat input state in welding is changed by the welding condition (such as a wire supply amount, a welding speed, or a welding current), as well as a welded state is changed in accordance with the heat input state, and thus the above-described target position needs to be decided in accordance with a difference in welding condition. For example, if control is performed such that a relative distance of the welding wire to the molten pool is constant, in a case where the molten pool is decreased due to the change in welding condition, the welding wire is moved in a direction to approach the electrode in accordance with the change amount of the molten pool. In this case, the electrode and the welding wire may contact each other.

With the above configuration (12), the input condition further includes the welding condition. Thus, it is possible to perform automatic arc welding of welding quality more appropriately.

(13) In some embodiments, in the above configuration (12), the welding condition includes at least one condition of an electrode current, an electrode voltage, a welding speed, a supply amount of the welding wire per unit time, or a groove width.

With the above configuration (13), it is possible to decide the actual position according to the welding condition including the above-described one condition.

(14) In some embodiments, in the above configurations (1) to (13), the first decision unit includes a first acquisition unit configured to acquire the image from a shooting part for shooting the image, a detection unit configured to detect the welding feature amount from the image for each predetermined control cycle, and a calculation unit configured to calculate the actual position based on the welding feature amount.

With the above configuration (14), the image obtained by shooting the welded section in welding is acquired from the shooting part, and the actual position is calculated based on the welding feature amount which is detected by performing image processing on (one or a plurality of) images obtained for each predetermined control cycle. Thus, by sequentially performing image processing on the images in welding, it is possible to sequentially calculate the actual position.

(15) In some embodiments, in the above configuration (14), the first decision unit further includes a first determination unit configured to determine a detected abnormality in the welding feature amount for each control cycle by the detection unit, in a normal control cycle which is the control cycle determined that the detected abnormality does not occur, calculates the actual position based on the welding feature amount which is detected from the image acquired in the normal control cycle, and in an abnormal control cycle which is the control cycle determined that the detected abnormality occurs, calculates the actual position based on the welding feature amount which is detected from the image acquired in the normal control cycle before the abnormal control cycle.

There can be a case where the welding feature amount cannot appropriately be detected, such as the welding feature amount cannot be detected or is erroneously detected by image processing, due to the fact that the image becomes too dark if a heat input amount set by the welding condition is too small and conversely, the image becomes too bright if the heat input amount is too large, for example.

With the above configuration (15), if the welding feature amount from the image is not appropriately detected, the actual position on the basis of the image determined that the detected abnormality does not occur is used by, for example, calculating the actual position by using, as a substitute, the welding feature amount (substitute feature amount) which is detected from the image acquired in the immediately preceding normal control cycle or the like. Thereby, it is possible to continuously execute welding. Further, it is possible to prevent a situation where welding is controlled based on the welding feature amount in which the detected abnormality occurs, prevent damage to the welding object and the welding execution device, and improve reliability of the welding control device.

(16) In some embodiments, in the above configuration (14), the first decision unit further includes a first determination unit configured to determine a detected abnormality in the welding feature amount for each control cycle by the detection unit, and stops controlling the position control object in the abnormal control cycle which is the control cycle determined that the detected abnormality occurs.

With the above configuration (17), it is possible to continuously execute welding while waiting for natural recovery of the detected abnormality.

(17) In some embodiments, in the above configurations (1) to (16), the welding control device further includes a second correction unit for correcting the target position decided by the second decision unit, if a failure event of the welding is detected.

For example, in occurrence of a droplet which is generated when the tip of the welding wire is not in the molten pool, it is necessary to move the welding wire downward in the image because it is necessary to bring the tip of the welding wire and the molten pool into contact with each other. Further, if poking occurs in which the tip of the welding wire hits the welding object which is the bottom of the molten pool, it is necessary to move the welding wire upward in the image to avoid the hit. If position control of the position control object such as the welding wire when such failure event of welding is detected and position control of the position control object such as the welding wire for the actual position to become the target position described above are performed separately, control hunting may be caused as a result of performing control in an opposite direction to each other, such as one performs downward control and the other performs upward control.

With the above configuration (17), by correcting the target position based on the failure event of welding, it is possible to avoid occurrence of the hunting.

(18) A welding control method according to at least one embodiment of the present invention is a welding control method configured to control a position control object which includes at least one of a welding wire used to weld a welding object or an electrode for melting the welding wire, the method including a step of deciding an actual position of the position control object based on a welding feature amount detected from an image which is shot to include at least the position control object, the welding feature amount including at least one of a wire position of the welding wire or an electrode position of the electrode, a step of deciding a target position which is a target of the actual position according to an input condition based on the input condition which includes at least one of attitude information of the electrode when the welding object is welded or shape information of the welding object, and a step of performing position control of the position control object so that the actual position becomes the target position.

With the above configuration (18), it is possible to achieve the same effect as the above configuration (1).

(19) A welding control program according to at least one embodiment of the present invention is a welding control program configured to control a position control object which includes at least one of a welding wire used to weld a welding object or an electrode for melting the welding wire, the program causing a computer to implement a first decision unit for deciding an actual position of the position control object based on a welding feature amount detected from an image which is shot to include at least the position control object, the welding feature amount including at least one of a wire position of the welding wire or an electrode position of the electrode, a second decision unit for deciding a target position which is a target of the actual position according to an input condition based on the input condition which includes at least one of attitude information of the electrode when the welding object is welded or shape information of the welding object, and a control unit for performing position control of the position control object so that the actual position becomes the target position.

With the above configuration (19), it is possible to achieve the same effect as the above configuration (1).

Advantageous Effects

According to at least one embodiment of the present invention, provided is a welding control device for controlling a welding procedure for a welding object in accordance with an attitude of an electrode and a shape of a welding object.

BRIEF DESCRIPTION OF DRAWINGS

FIG. 1A is a perspective view showing a configuration example of a welding device according to an embodiment of the present invention.

FIG. 1B is a view for describing attitude control of an electrode according to an embodiment of the present invention.

FIG. 2 is a view showing an image of a welded section according to an embodiment of the present invention.

FIG. 3A is a functional block diagram of a welding control device according to an embodiment of the present invention and includes a condition-based target decision unit.

FIG. 3B is a functional block diagram of the welding control device according to an embodiment of the present invention and includes a position-based target decision unit.

FIG. 6 is a view for describing an estimation method for a groove width in weaving welding according to an embodiment of the present invention.

DETAILED DESCRIPTION

Figure 4:
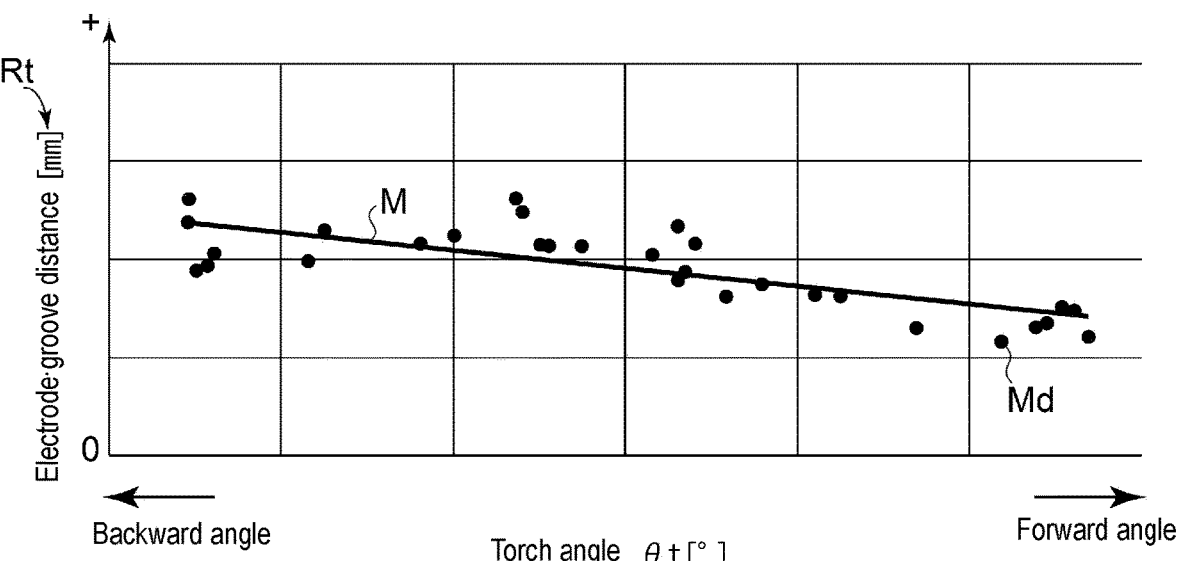
FIG. 4 is a graph showing a correlation between a target relative position and attitude information of the electrode according to an embodiment of the present invention.

Some embodiments of the present invention will be described below with reference to the accompanying drawings. It is intended, however, that unless particularly identified, dimensions, materials, shapes, relative positions and the like of components described or shown in the drawings as the embodiments shall be interpreted as illustrative only and not intended to limit the scope of the present invention.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same", "equal", and "uniform" shall not be construed as indicating only the state in which the feature is strictly equal, but also includes a state in which there is a tolerance or a difference that can still achieve the same function.

Further, for instance, an expression of a shape such as a rectangular shape or a tubular shape shall not be construed as only the geometrically strict shape, but also includes a shape with unevenness or chamfered corners within the range in which the same effect can be achieved.

On the other hand, the expressions "comprising", "including", "having", "containing", and "constituting" one constituent component are not exclusive expressions that exclude the presence of other constituent components.

FIG. 1A is a perspective view showing a configuration example of a welding device 7 according to an embodiment of the present invention. FIG. 1B is a view for describing attitude control of an electrode 82 according to an embodiment of the present invention. FIG. 2 is a view showing an image V of a welded section according to an embodiment of the present invention. The welding device 7 is a device for automatically arc welding a welding object such as a steel plate. As shown in FIG. 1A, the welding device 7 includes a welding control device 1 for controlling a welding procedure, and a welding execution device 8 for executing arc welding in accordance with control (command) from the welding control device 1. First, the welding execution device 8 constituting the welding device 7 will be described. The welding execution device 8 includes a wire feed mechanism 81, the electrode 82, an attitude control mechanism 82c, and a shooting part 83.

The wire feed mechanism 81 is a mechanism for sequentially feeding (supplying) a welding wire 8w consumed with the welding procedure toward a welded section of a welding object 9. A tip portion of the welding wire 8w set in the wire feed mechanism 81 is melted by arc discharge from the electrode 82, and then a metal of liquid phase (molten pool 8m) where the welding wire 8w is melted is cooled and solidified in the welded section (welded portion) of the welding object 9, thereby welding the welding object 9.

The attitude control mechanism 82c is a mechanism having multi joints (multi axes; not shown), for controlling the attitude of the electrode 82 while supporting the electrode 82. More specifically, for example, controlling each joint in accordance with command values of parameters (attitude control parameters) for attitude control, such as a torch angle $\theta t$ (advance angle/backward angle), an inclination angle $\theta d$, and a roll angle $\theta r$ (see FIG. 1B), it is possible to change a position of the electrode 82 (a position of a space occupied by the electrode).

Thus, it is possible to place the electrode 82 in the vicinity of the tip portion of the welding wire 8w while avoiding an obstacle such as a portion other than the welded section of the welding object 9, and to change a discharge direction of an arc discharged from the electrode 82 with directivity. Moreover, even if the welded section of the welding object 9 does not merely extend in the horizontal direction but extends to be inclined with respect to the gravity direction, it is possible to control the attitude of the electrode 82 so that welding is executed appropriately. Adjusting the torch angle $\theta t$ such as applying the advance angle if a line to be welded (weld line) is an up line climbing a slope and applying the backward angle if the line is a down line, the molten pool 8m is formed appropriately.

The torch angle $\theta t$ is an angle of the electrode 82 with respect to a welding direction and if the angle at which the electrode 82 is placed to completely coincide with the up-down direction is 0 degrees, an angle at which the advance angle is applied may be defined as a plus side and an angle at which the backward angle is applied may be defined as a minus side. Moreover, the torch angle $\theta t$ is an inclination angle from the up-down direction, and applying the inclination angle $\theta d$, it is possible to incline the electrode 82 to the right and left with respect to the weld line without changing a position of the tip portion of the electrode 82. Moreover, the roll angle $\theta r$ is a rotation angle about an axis of the rod-like electrode 82, and applying the roll angle $\theta r$, it is possible to rotate the electrode 82 (torch 82t). If the arc discharged from the electrode 82 has directivity, it is also possible to change the discharge direction of the arc by changing the roll angle $\theta r$. The roll angle $\theta r$ may be defined, for example, with reference to an attitude if the directivity orientation of the arc is directed to the welding direction, by a rotation angle from the reference. Then, multiply changing at least one such parameter, it is possible to flexibly change the attitude of the electrode 82.

In the embodiment shown in FIG. 1A, 1B, a welded section of the welding object 9 is a gap formed between two members. The welded section may be, for example, a gap formed between a tube stand and a pipe. The gap between the tube stand and the pipe has an arc shape as a whole, and the welding procedure is performed by relatively moving the wire feed mechanism 81 and the electrode 82 along the longitudinal direction of the gap of the welding object 9 with the attitude of the electrode 82 being controlled. More specifically, relatively moving the wire feed mechanism 81 and the electrode 82 at a predetermined welding speed along the longitudinal direction of the gap of the welding object 9, the molten pool 8m which is the metal of liquid phase obtained by melting the welding wire 8w is sequentially formed along the welding direction (the longitudinal direction of the gap) (see FIG. 2). Then, the molten pool 8m is cooled and solidified, welding the welding object 9.

In the following description, a direction in front/rear of the welding direction will be referred to as a front-rear direction, a width direction of the gap of the welding object 9 (a direction orthogonal to the longitudinal direction) will be referred to as a right-left direction, and up/down of the gravity direction will be referred to as an up-down direction (vertical direction). Further, in an actual welding procedure, the tip of the welding wire 8w and the electrode 82 are in closer positional relationship than in FIG. 1A, for example, at least some of members (the torch 82t and the attitude control mechanism 82c) for supporting the electrode 82 including the electrode 82 are located above such as immediately above the welding wire 8w.

Furthermore, the shooting part 83 is a shooting device such as a camera for shooting a moving image or a still image, and is installed to shoot a welded section. The image V (to simply be referred to as the image V, hereinafter) of the welded section shot by the shooting part 83 is used to detect positions of at least two shooting objects of the welding wire 8w, the molten pool 8m, the electrode 82 described above, and a groove 91 which is a wall surface forming the gap of the welding object 9. In the embodiment shown in FIG. 1A, 1B, the shooting part 83 is installed on the attitude control mechanism 82c and changes a shooting direction in accordance with attitude control of the electrode 82. Moreover, in order to shoot the above-described shooting objects in the same image, the shooting part 83 is installed at a position to look down the welded section from obliquely above. For example, in the embodiment shown in FIG. 1A, 1B, the shooting part 83 is configured to shoot the welded section such that the image V includes the welding wire 8w, the electrode 82, the molten pool 8m, and the groove 91, as shown in FIG. 2.

In the welding procedure of the welding object 9 by using the welding execution device 8 having the above-described configuration, the welding execution device 8 and the welding object 9 relatively move, and a position of the groove 91 in the image V installed on the welding execution device 8 changes in accordance with the shape of the welding object 9, as described above. Likewise, the welding wire 8w wound by a reel is drawn out to be supplied to the welded section by using the wire feed mechanism 81, the position of the welding wire 8w in the image V also changes due to, for example, a bending tendency of the welding wire 8w. Thus, the welding execution device 8 has a mechanism for moving (adjusting) the positions of the welding wire 8w and the electrode 82.

More specifically, in the embodiment shown in FIG. 1A, 1B, it is possible to move each of the welding wire 8w and the electrode 82 in the front-rear direction and the right-left direction in the image V, and it is possible to perform the above-described attitude control of the electrode 82. Then, as shown in FIG. 1A, 1B, with the welding wire 8w or the electrode 82 described above being a position control object 8T, the welding execution device 8 is configured to move the position of the position control object 8T in accordance with an instruction from the welding control device 1 to be described below.

The welding control device 1 will be described below with reference to FIGS. 1A to 11.

FIGS. 3A and 3B are each a functional block diagram of the welding control device 1 according to an embodiment of the present invention.

The welding control device 1 is a device configured to control a position of the position control object 8T which includes at least one of the welding wire 8w used to weld the welding object 9 or the electrode 82 for melting the welding wire 8w. As shown in FIGS. 3A and 3B, the welding control device 1 includes a first decision unit (such as an actual relative position decision unit 2 to be described later) for deciding (acquiring) an actual position of the position control object 8T based on a welding feature amount P detected from the image V which is shot to include at least the position control object 8T, the welding feature amount P including at least one of a wire position Pw of the welding wire 8w or an electrode position Pe of the electrode 82, a second decision unit (such as a target relative position decision unit 3 to be described later) for deciding a target position which is a target of the above-described actual position according to an input condition C based on the input condition C which includes at least one of attitude information Ce of the electrode 82 when the welding object 9 is welded or shape information Cs of the welding object 9 (welded portion), and a control unit 5 for performing position control of the position control object 8T so that the above-described actual position becomes the target position.

The attitude information Ce of the electrode 82 is information on the attitude of the electrode 82, and includes at least one kind of attitude control parameter described above. Further, the shape information Cs of the welding object 9 (welded portion) is information on the shape of the welding object 9 such as the welded portion, and may include a groove width L of the groove 91, for example.

The actual position of the position control object 8T described above is the actual position detected from the image V, and the actual position may be, for example, a position (absolute position) in a coordinate system set in the image V, or may be a relative position (actual relative position Rr) of the wire position Pw, the electrode position Pe, which is the position of the position control object 8T, from the another welding feature amount P (such as a molten pool position Pm, a groove position Pb to be described later). The actual relative position Rr may be a distance along a direction to control the position control object 8T. Alternatively, the actual relative position Rr may be a position (coordinate) with reference to an optional position such as a lower left end of the image V, or the other position (coordinate) with reference to one of the two welding feature amounts P constituting the actual relative position Rr.

On the other hand, if the position of the welding feature amount P is the absolute position, control is performed such that the absolute position such as the wire position Pw sets a middle position of the image V in the right-left direction (to be described later) as the target position, in a state where, for example, a camera shooting the image V is fixed so a shooting direction is not changed by the attitude of the electrode 82. Alternatively, a function capable of calculating a target absolute position corresponding to the above-described target position from the absolute position or the another welding feature amount P is prepared in advance, and the target absolute position may be obtained from the welding feature amount P by using such function. More specifically, for example, the target absolute position is obtained from a position in the right-left direction (to be described later) of the electrode position Pe and the groove position Pb, by using a non-linear function, a table, or the like.

Hereinafter, the above-described functional units of the welding control device 1 will be described by taking, as an example, the embodiments shown in FIGS. 3A and 3B which are the embodiments where the position of the welding feature amount P is the relative position. The embodiment of a case where the actual position of the position control object 8T is the absolute position can be considered by reading, in the following description, the actual relative position Rr as the absolute position and a target relative position Rt as a target absolute position.

As shown in FIGS. 3A and 3B, the welding control device 1 includes the actual relative position decision unit (above-described first decision unit), the target relative position decision unit 3 (above-described second decision unit), and the control unit 5. The welding control device 1 is constituted by a computer, and includes a CPU (processor; not shown) and a storage device m serving as, for example, an external storage device or a memory such as a ROM or a RAM. Then, the CPU performs an operation (such as computation of data) in accordance with an instruction of a program (welding control program 10) loaded to a memory (main storage device), thereby implementing the above-described functional units of the welding control device 1. In other words, the above-described welding control program 10 is software for causing the computer to implement the respective functional units to be described later, and may be stored in a computer-readable storage medium.

The above-described functional units of the welding control device 1 will be described.

The actual relative position decision unit 2 decides the actual relative position Rr which is the relative position of any two of the welding feature amounts P detected from the image V described above, the welding feature amounts P including at least two of the groove position Pb of the groove 91, the wire position Pw of the welding wire 8w, the molten pool position Pm of the molten pool 8m, or the electrode position Pe of the electrode 82. The image V is shot to include the position control object 8T and at least one of the groove 91 of the welding object 9 or the molten pool 8m formed in the groove 91 by melting the welding wire 8w. More specifically, if the position control object 8T is the welding wire 8w, the image V may include at least a portion of the wire position Pw of the welding wire 8w, at least a portion of the molten pool position Pm of the molten pool 8m, or at least a portion of the groove position Pb of the groove 91. On the other hand, if the position control object 8T is the electrode 82, the image V may include at least a portion of the electrode position Pe of the electrode 82 and at least a portion of the groove position Pb of the groove 91.

Further, the above-described wire position Pw is a position of a desired section in the welding wire 8w. The molten pool position Pm is a desired section in the molten pool 8m. The groove position Pb is a position of a desired section in the groove 91. The electrode position Pe is a position of a desired section in the electrode 82. In the embodiments shown in FIGS. 3A and 3B, as shown in FIG. 2, the wire position Pw is a position of the tip portion of the welding wire 8w located on a rearmost side (lowest side in the up-down direction) in the image V. The molten pool position Pm is a position of a tip portion of the molten pool 8m located on a foremost side in the image V. The groove position Pb is a position of a predetermined portion determined by a relative position to the electrode 82. Further, the electrode position Pe is a tip portion of the electrode 82 located on the rearmost side (lowest side in the up-down direction) in the image V. Furthermore, in the embodiments shown in FIGS. 3A and 3B, the welding feature amounts P include at least the wire position Pw and the molten pool position Pm.

More specifically, the actual relative position decision unit 2 performs image processing on the image V, thereby detecting the welding feature amount P and calculating the actual relative position Rr based on the detection result. For example, if the position control object 8T is the welding wire 8w, in order to perform position control in the up-down direction thereof, the wire position Pw and the molten pool position Pm are detected. Alternatively, in order to perform position control in the right-left direction of the welding wire 8w, the wire position Pw and the groove position Pb are detected. On the other hand, if the position control object 8T is the electrode 82, in order to perform position control in the right-left direction thereof, the electrode position Pe and the groove position Pb are detected.

In the embodiments shown in FIGS. 3A and 3B, the position control object 8T is at least the welding wire 8w. Then, as shown in FIGS. 3A and 3B, the actual relative position decision unit 2 includes a first acquisition unit 21 for acquiring the image V from the shooting part 83 for shooting the welded section in welding, a detection unit 22 for detecting the welding feature amount P from the (one or a plurality of) image V acquired by the first acquisition unit 21 for each predetermined control cycle T, and a calculation unit 24 for calculating the actual relative position Rr based on the detected welding feature amount P.

More specifically, the above-described first acquisition unit 21 is connected to the shooting part 83, thereby receiving the images V sequentially (in real time). Further, the detection unit 22 is connected to the first acquisition unit 21, thereby sequentially receiving the images V acquired by the first acquisition unit 21. The first acquisition unit 21 may store all the input images V in the storage device m, or may store some of the input images V in the storage device m by, for example, decimating the images V at predetermined intervals or the like. The images V stored by the first acquisition unit 21 are input to the detection unit 22. Then, the detection unit 22 detects the welding feature amount P for each predetermined control cycle T. The calculation unit 24 is connected to the detection unit 22, thereby sequentially receiving the welding feature amounts P. Thus, by sequentially performing image processing on the images V in welding, it is possible to sequentially calculate the actual relative position Rr.

The target relative position decision unit 3 decides the target relative position Rt which is the target of the above-described relative position (the actual relative position Rr such as the electrode groove relative position, a wire pool relative position) according to the input condition C when the welding object 9 is welded. The target relative position Rt needs to be comparable with the above-described actual relative position Rr. The target relative position Rt may be decided by applying machine learning, and a decision method therefor will be described later. Further, the input condition C is a condition influencing a welding state of the welding object 9 by the welding execution device 8, and includes at least one of the attitude information Ce of the electrode 82 or the shape information Cs of the welding object 9.

The input condition C is configured such that, for example, the attitude of the electrode 82 is changed to mainly avoid interference with an obstacle in welding or appropriately form the molten pool 8m if the weld line (groove 91) is inclined with respect to the up-down direction. If the attitude of the electrode 82 is changed, the positional relationship between the groove 91 and a discharge direction of arc from the electrode 82 can accordingly be changed regardless of the presence or absence of a change in wire position Pw, and thus the shape of the molten pool 8m can be changed. Then, if the molten pool position Pm is changed in accordance with the change in shape of the molten pool 8m, the target relative position Rt can also be changed. In fact, as shown in FIG. 4, 5 to be described later, the present inventors have found that the target relative position Rt is changed in accordance with the input condition C.

The control unit 5 performs position control of the position control object 8T for setting the actual relative position Rr decided by the actual relative position decision unit 2 described above to the target relative position Rt decided by the target relative position decision unit 3 described above. In other words, the position control of the position control object 8T calculates a control amount of the position control object 8T which is needed for a difference (shift amount) between the actual relative position Rr and the target relative position Rt to fall within a predetermined range including zero, and transmits the calculated control amount to the welding execution device 8. Then, the welding execution device 8 controls the position of the position control object 8T in accordance with the received control amount.

More specifically, the control amount may be a movement amount from a current position to a direction in which the position control object 8T should move, or may be a coordinate to which the position control object 8T should move in a coordinate system where the welding execution device 8 recognizes the position. Further, the control unit 5 may control, through the image processing on the image V, the position of the position control object 8T while detecting a position obtained after moving relative to the transmitted control amount (feedback control).

For example, by detecting (detection unit 22) the electrode position Pe of the electrode 82 and the wire position Pw from the actual relative position decision unit 2, the image V, as well as calculating (calculation unit 24) the target relative position Rt based on the input condition C, at least one of the electrode 82 or the wire position Pw may be controlled in the front-rear direction or the like such that the actual relative position Rr of the electrode position Pe to the wire position Pw becomes the target relative position Rt. By detecting (detection unit 22) the electrode position Pe and the groove position Pb of the groove 91 from the actual relative position decision unit 2, the image V, as well as calculating (calculation unit 24) the actual relative position Rr (electrode groove relative position) based on the input condition C, and the welding feature amounts P including the detected electrode position Pe and groove position Pb, the electrode 82 may be controlled in the right-left direction or the like such that the actual relative position Rr of the electrode position Pe to the groove position Pb becomes the target relative position Rt. Likewise, by detecting the actual relative position decision unit 2, the welding feature amounts P including the wire position Pw and the molten pool position Pm, the actual relative position Rr (wire pool relative position) may be calculated based on the welding feature amounts P including the detected wire position Pw and molten pool position Pm. At this time, the relative position may be a relative position (wire pool relative position) of the wire position Pw to the molten pool position Pm along the front-rear direction, or may be a relative position of the wire position Pw to the molten pool position Pm along the right-left direction.

Further, as shown in FIG. 2, the electrode position Pe may be the tip portion of the electrode 82 located on the foremost side in the front-rear direction, and the groove position Pb may be a position of a predetermined section determined by the relative position to the electrode 82. At least one of the welding wire 8w or the electrode 82 may be controlled such that the actual relative position Rr of the electrode position Pe to the wire position Pw becomes the target relative position Rt.

According to the above configuration, the welding control device 1 decides the target position (target relative position Rt) of the position control object 8T, such as the welding wire 8w or the electrode 82, in accordance with the input condition C including the attitude information Ce of the electrode 82 or the shape information Cs (such as the groove width) of the welding object 9. Then, the welding control device 1 controls the welding execution device 8 such that the actual position (actual relative position Rr) of the position control object 8T which is obtained through the image processing on the image V shot during welding coincides with the target position. Thus, it is possible to automatically execute arc welding with the same welding quality as the case where arc welding is executed by the welder, and it is possible to implement automatic welding reduced in dependency on a skill of the welder.

Figure 5:
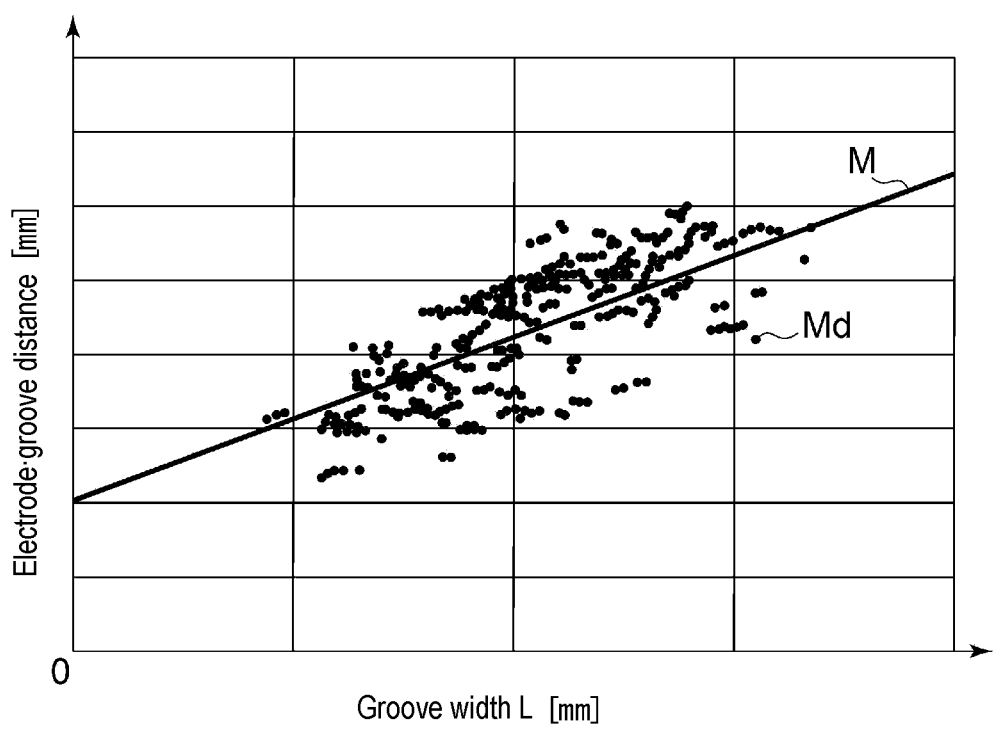
FIG. 5 is a graph showing a correlation between the target relative position and shape information of a welding object according to an embodiment of the present invention.

Next, some embodiments related to decision of the target relative position Rt in the embodiment described above will be described with reference to FIGS. 4 to 6. FIG. 4 is a graph showing a correlation between the target relative position Rt and the attitude information Ce of the electrode 82 according to an embodiment of the present invention. FIG. 5 is a graph showing a correlation between the target relative position Rt and the shape information Cs of the welding object 9 according to an embodiment of the present invention. FIG. 6 is a view for describing an estimation method for the groove width L in weaving welding according to an embodiment of the present invention.

In the following description, the actual relative position Rr and the target relative position Rt described above may be the relative position of the wire position Pw to the molten pool position Pm, or may be the relative position of the electrode position Pe to the groove position Pb. However, the present invention is not limited thereto, but the actual relative position Rr and the target relative position Rt may be the relative position of any two of the above-described welding feature amounts P (the wire position Pw, the molten pool position Pm, the electrode position Pe, the groove position Pb).

In some embodiments, as shown in FIGS. 3A and 3B, the above-described target relative position decision unit 3 (second decision unit) includes a second acquisition unit 3a for acquiring at least some of the input conditions C when the welding object 9 is welded, and a third decision unit 3b for deciding the target relative position Rt (target position; the same applies hereafter) according to the input conditions C acquired by the second acquisition unit 3a from the input conditions C, based on the relationship between an input condition in previous welding (previous input condition) and a previous relative position (previous position; the same applies hereafter) which is the relative position of the any two of the welding feature amounts P described above, such as a relative position of the previous molten pool position Pm (previous molten pool position) to the previous wire position Pw (previous wire position) or a relative position of the previous electrode position Pe (previous electrode position) to the previous groove position Pb, set under the previous input condition.

That is, the above-described relationship is derived by, in the previous welding procedure, accumulating information on how the welder sets the relative position of the any two of the welding feature amounts P, such as the position of the electrode position Pe relative to the groove position Pb, the wire position Pw relative to the molten pool position Pm, and the wire position Pw relative to the electrode position Pe, in association with a record of information on contents of the input condition C at that time, and learning (machine learning) the above as learning data.

More specifically, the above-described third decision unit 3b may decide the target relative position Rt according to the input condition C during welding, by using a learning model M which is obtained by machine learning of a plurality of data associating the above-described previous input condition with the previous relative position set under the previous input condition. The above-described plurality of data are obtained by acquiring, for example, a plurality of times at different times, an information set of the input condition C and the previous relative position calculated based on the welding feature amounts P at the same timing. The plurality of data may include information on a time, a place, and a time of welding procedure for the different welding objects 9. Then, with the thus obtained plurality of data associating the previous relative position at each of a plurality of timings with the input condition C being learning data Md, machine learning is performed.

To learning of the learning data Md, a known method such as neutral network, SVM (Support Vector Machine), random forest, or a regression analysis may be applied. The thus obtained learning model M is derivation of the relationship between the above-described previous relative position and the input condition C performed by the welder. Thus, using the learning model M, it is possible to obtain the target relative position Rt such as the wire pool relative position or the electrode groove relative position which would be set by the welder for the input condition C to be an input. Thus, using the learning model M, the target relative position decision unit 3 can decide the target relative position Rt corresponding to the acquired input condition C.

For example, the present inventors have found that there is a correlation between the target relative position Rt and the attitude information Ce of the electrode 82, through an intensive analysis of welding data when a skilled welder operates the welding execution device 8. More specifically, for example, as shown in FIG. 4, the skilled welder operates the electrode 82 such that a distance (ordinate) between the electrode 82 and the groove 91 (to be referred to as an electrode·groove distance, hereinafter) decreases as a torch angle θt (abscissa) increases (the forward angle increases, or the backward angle decreases), finding the correlation between the torch angle θt and the electrode·groove distance.

Thus, obtaining the relationship as indicated by a regression line of FIG. 4 through learning (machine learning) of the relationship between the torch angle θt and the electrode·groove distance in the previous welding data by using a learning method such as regression analysis (simple regression), the learning model M (function) capable of obtaining the electrode·groove distance from the torch angle θt is obtained. Then, the learning model M is stored in the storage device m, allowing the target relative position decision unit 3 to calculate the target relative position Rt on the basis of the torch angle θt by using the learning model M. Thus, it is possible to appropriately perform position control of the electrode 82 which is the position control object 8T in accordance with the opened torch angle θt.

Likewise, the present inventors have found, from the above-described welding data, that there is a correlation between the target relative position Rt and the shape information Cs of the welding object 9. More specifically, for example, as shown in FIG. 5, the skilled welder operates the electrode 82 such that the electrode·groove distance (ordinate) increases as the groove width L (abscissa) increases, finding the correlation between the groove width L and the electrode·groove distance. Thus, obtaining the relationship as indicated by a regression line of FIG. 5 through learning (machine learning) of the relationship between the groove width L and the electrode·groove distance in the previous welding data by using the learning method such as regression analysis (simple regression), the learning model M (function) capable of obtaining the electrode·groove distance from the groove width L (shape information Cs) is obtained. Then, the learning model M is stored in the storage device m, allowing the target relative position decision unit 3 to calculate the target relative position Rt on the basis of the groove width L by using the learning model M. Thus, it is possible to appropriately perform position control of the electrode 82 which is the position control object 8T in accordance with the groove width L.

The electrode·groove distance (ordinate) of FIG. 5 is a distance (left distance Ll; see FIG. 6) between the electrode 82 and the groove 91 (left groove position) reflected on the left side of the image V. In the embodiment shown in FIG. 6, with respect to the welding direction, a plurality of passes are welded in the right-left direction, and are welded to be laminated in the up-down direction. Further, weaving welding where welding is executed while swinging the electrode in the right-left direction addresses a case where welding of a right pass is executed.

At this time, the shape of the welding object 9 may constantly change during welding. Thus, if weaving welding is executed in a case where the groove width L of the welding object 9 changes during welding, it may be difficult to acquire the groove width L during welding, such as depending on brightness of the image V, it may be possible to detect only the groove position Pb of the groove 91 on a side approached by weaving. Thus, in some embodiments, the above-described target relative position decision unit 3 may estimate the above-described groove width L based on the image V and a weaving width Lw of the electrode 82, and may decide the target relative position Rt of the electrode 82 based on the estimated groove width L.

More specifically, as shown in FIG. 6, since the groove 91 on the side approached by the electrode 82 through weaving is visible, a distance (right distance Lr) between the electrode 82 and the groove 91 (right groove position) reflected on the right side of the image V is acquired based on the image V when the rightmost groove 91 is approached. Further, the distance (left distance Ll) between the electrode 82 and the groove 91 (left groove position) reflected on the left side of the image V is acquired based on the image V when the leftmost groove 91 is approached. That is, if the electrode 82 moves once between the left groove 91 and the right groove 91 by one weaving operation, the right distance Lr and the left distance Ll are obtained. Moreover, the weaving width Lw is a value obtained when the welding execution device 8 is controlled. Thus, by one weaving operation, it is possible to calculate the groove width L based on the right distance Lr, the left distance Ll, and the weaving width Lw (L=Ll+Lw+Lr). Then, the groove width L corresponding to the following one weaving operation has a value generally close to a calculated value obtained as described above, if the groove width L slowly changes along the welding direction. Thus, setting the calculated value as an estimated value of the groove width L of a section where welding is to be executed, it is possible to appropriately decide the target relative position Rt based on the estimated value of the groove width L.

According to the above configuration, a correspondence relationship between a record of the absolute position of the position control object 8T, or the actual position which is, for example, the relative position of any two of the welding feature amounts P such as the relative position of the electrode 82 to the groove 91 or the relative position of the welding wire 8w to the molten pool 8m which is obtained as the result of operating the position control object 8T by the welder, and the input condition C at the time is accumulated for learning (for example, machine learning), and the target position (such as the target relative position Rt) according to the input condition C in welding is obtained by using the learning result. Thus, it is possible to appropriately decide the target position of the position control object 8T. Further, using the thus decided target position for position control, it is possible to implement the same welding quality as the case where welding is executed by the welder.

Figure 7:
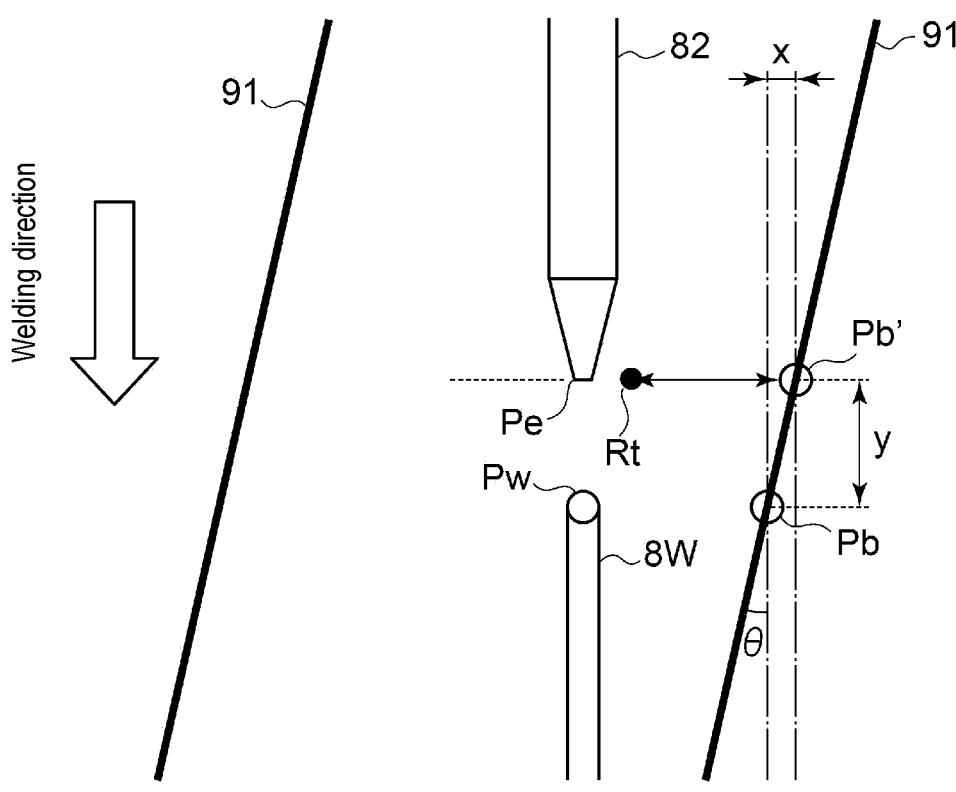
FIG. 7 is a view for describing a correction method on the basis of a roll angle of a groove position according to an embodiment of the present invention.

Next, some embodiments related to decision of the actual relative position Rr (actual position) of the position control object 8T by the above-described actual relative position decision unit 2 (first decision unit) will be described with reference to FIG. 7. FIG. 7 is a view for describing a correction method on the basis of the roll angle θr of the groove position Pb according to an embodiment of the present invention.

It is considered that the welder moves the position control object for a determined target position while seeing one of the portions such as the welding wire, the electrode, the molten pool, or the groove represented in the image. Then, if the target position is obtained from the relationship between the input condition and the portion seen by the welder, it is considered possible to bring the welding quality of automatic arc welding closer to that of the welder. For example, if the welding feature amount (such as the groove position) to be detected from the image that increases the correlation between the input condition and the target position such as the target relative position is known through analysis of the welding data, the position of the welding feature amount obtained as the result of image processing may deviate from an appropriate position which is supposed to be detected.

For example, if the shooting part 83 for shooting the image V is installed in the control mechanism (attitude control mechanism 82c) for controlling the attitude of the electrode 82 (see FIG. 1A), the shooting direction to shoot the welding object 9 may be changed in accordance with attitude control of the electrode 82. In this case, the change in attitude changes the way the shooting object such as the position control object 8T or the welding object 9 represented in the image V is reflected (seen). Thus, the welding feature amount P such as the groove position Pb of the groove 91 obtained as the result of image processing may deviate from the appropriate position which is supposed to be detected. Then, the target relative position Rt (target position) decided based on the welding feature amount P where the above-described deviation is caused has low correlation with respect to the input condition C. If such target relative position Rt is used for control, accuracy of position control of the position control object 8T such as the electrode 82 may be decreased.

Thus, in some embodiments, the welding feature amount P may be corrected based on the attitude information Ce of the electrode 82, and the actual relative position Rr of the position control object 8T may be decided based on the corrected welding feature amount P.

More specifically, in some embodiments, the image V is shot to include at least the position control object 8T and the groove 91 of the welding object 9. Further, the welding feature amount P includes at least the wire position Pw or the electrode position Pe and the groove position Pb. Furthermore, the shooting part 83 for shooting the image V is installed such that the shooting direction to shoot the welding object 9 is set in accordance with the attitude of the electrode 82. For example, as shown in FIG. 1A, the shooting part 83 is fixed to the attitude control mechanism 82c to shoot the vicinity of the tip of the electrode 82, and thus the direction of the tip portion of the electrode 82 with respect to the groove 91 changes if the attitude of the electrode 82 changes. Accordingly, the shooting direction of the groove 91 shot together with the electrode 82 changes.

Then, in this case, the above-described actual relative position decision unit 2 corrects the groove position Pb based on the attitude information Ce of the electrode 82, and decides the actual relative position Rr (actual position) based on the welding feature amount P including the corrected groove position Pb (corrected groove position Pb'). For example, as shown in FIGS. 3A and 3B, the actual relative position decision unit 2 may further include a first correction unit 22c configured to correct the groove position Pb based on the attitude information Ce of the electrode 82. In the embodiments shown in FIGS. 3A and 3B, the first correction unit 22c is provided to be included in the detection unit 22.

A method for correcting the groove position Pb will be described with reference to FIG. 7. In FIG. 7, the electrode 82 is applied with the roll angle θr other than 0°, and the shooting part 83 also rotates by the roll angle θr with respect to the groove 91 by rotating together with the electrode 82. Thus, in the image V shown in FIG. 7, the groove 91 is shot in a state where the groove 91 is inclined with respect to the welding direction by the angle θr. Then, performing image processing on the image V, a position in the vicinity of just beside the welding wire 8w is detected as the groove position Pb. The groove position Pb detected from the image V depends on a shooting condition such as brightness in shooting, and thus one of portions of the groove 91 is detected as a result of processing according to an algorithm of image processing.

At this time, the portion of the groove 91 (the position of Pb') located just beside the electrode 82 as the groove position Pb is more desirable as the groove position Pb to be detected. The position desirable as the groove position Pb is, for example, the position which is found, from analysis of the welding data, to have high correlation between the target relative position Rt and the input condition C. For example, in the case of FIG. 4, the electrode·groove distance is obtained by detecting the electrode position Pe and the groove position Pb, but a difference in level of correlation (correlation coefficient) is caused depending on which position is detected from the image V as the electrode position Pe. In FIG. 4, the position desirable as the groove position Pb is the groove position Pb where the correlation between the torch angle θt and the electrode·groove distance is the highest.

Thus, using the above-described desirable groove position Pb (corrected groove position Pb') instead of the groove position Pb detected from the image V, it is possible to accurately decide the target relative position Rt. More specifically, as shown in FIG. 7, a length y between the detected groove position Pb and the corrected groove position Pb' along the welding direction is found from the image V. More specifically, since the groove position Pb and the electrode position Pe are detected by image processing, the length y along the welding direction is specified. The roll angle θr is set in accordance with execution of welding, and is thus specified. Further, a length x between the groove position Pb detected by image processing and the corrected groove position Pb' in a direction orthogonal to the welding direction can be obtained by $x = y \times \tan(\theta r)$. With the above relation, it is possible to obtain the corrected groove position Pb' from the detected groove position Pb.

According to the above configuration, if the shooting direction to shoot the welding object 9 by the shooting part 83 for shooting the image V is set in accordance with the attitude of the electrode 82, the welding feature amount P such as the groove position Pb serving as the welding feature amount P is corrected based on the attitude information Ce of the electrode 82. Thus, it is possible to perform position control of the position control object 8T more accurately by using the more appropriate welding feature amount P.

Next, a case where the above-described input condition C includes a welding condition Cw will be described.

In some embodiments, as shown in FIGS. 3A and 3B, the above-described input condition C may further include the welding condition Cw when the welding object 9 is welded. The welding condition Cw is a condition influencing a welded state of the welding object 9 by the welding execution device 8, and is a condition for directly adjusting (controlling) a heat input condition. That is, if the welding condition Cw changes, the heat input condition (heat input state) in welding changes. For example, the welding condition Cw may include at least one condition of an electrode current or an electrode voltage with respect to the electrode 82, a welding speed which is a speed of relative movement of the welding execution device 8 to the welding object 9 (movement speed of arc), a supply amount (supply amount per unit time) of the welding wire 8$w$, or the groove width L of the groove 91.

More specifically, in some embodiments, as shown in FIG. 3A, the above-described target relative position decision unit 3 may include the second acquisition unit 3$a$ for acquiring the input condition C including at least one of the attitude information Ce of the electrode 82 or the shape information Cs of the welding object 9 (welded portion) and the welding condition Cw, and the above-described third decision unit 3$b$ (condition-based target decision unit 32). In the embodiment shown in FIG. 3A, the condition-based target decision unit 32 decides the target relative position Rt according to the input condition C during welding, by using the learning model M (condition-based learning model) which is obtained by machine learning of the learning data Md associating the previous input condition in previous welding with the previous relative position set under the previous input condition.

Since the input condition C includes the welding condition Cw, if the input condition C includes a plurality of conditions, at least two conditions of the plurality of conditions may be consolidated to a single condition to reduce the number (dimension) of the conditions included in the input condition C. More specifically, if the welding condition Cw includes a plurality of conditions, at least two conditions of the plurality of conditions may be consolidated to a single condition to reduce the number (dimension) of the conditions included in the welding condition Cw to be an input. In this case, the welding condition Cw includes the consolidated condition obtained by consolidating the at least two conditions of the welding condition Cw to the single condition, and another condition. Thus, the target relative position decision unit 3 decides the target relative position Rt according to the welding condition Cw including such consolidated condition, and at least one the attitude information Ce of the electrode 82 or the shape information Cs of the welding object 9 (welded portion).

For example, a relationship between the previous relative position, and the input condition C with the welding condition Cw including consolidation of three conditions, that is, the welding speed, the welding current, and the welding voltage to one condition, that is, a heat input amount may be learned. The learning model M in this case includes the one condition, the heat input amount instead of the three conditions, that is, the welding speed, the welding current, and the welding speed. The heat input amount is the amount of heat supplied to the weld part from the outside, and there is the relation of heat input amount=$\{60\times$welding current$\times$welding voltage$\}\div$welding speed. However, the present invention is not limited to the present embodiment. Depending on the situation, a condition representing the relationship with the target relative position Rt the most can be consolidated. For example, in some other embodiments, the two conditions, that is, the welding speed and the welding current can be consolidated to the one condition, that is, the heat input amount.

In a case where a relationship between a plurality of welding conditions Cw and the target relative position Rt is tabulated in advance by using the learning model M, if the welding condition Cw includes the plurality of conditions, a table encompassing a combination of the plurality of conditions is needed. However, if the number of conditions increases, the number of combinations thereof increases, increasing a cost of creating the table. As described above, the plurality of conditions are consolidated to the single condition to reduce the number of dimensions, it is possible to reduce the cost of creating the table.

The welding condition Cw when the welding object 9 is welded may acquire a set value set in the welding execution device 8 or the like from the welding execution device 8, or may acquire an input from an operator or the like.

According to the above configuration, the correspondence relationship between the record of the relative position of any two of the welding feature amounts P such as the relative position of the welding wire 8$w$ to the molten pool 8$m$ obtained at the result of operating the position control object 8T such as the welding wire 8$w$ by the welder in the past, and the input condition C at the time including at least one of the attitude information Ce of the electrode 82 or the shape information Cs of the welding object 9 (welded portion) and the welding condition Cw is accumulated for learning (machine learning), and based on the learning result, the target relative position Rt is obtained directly from the welding condition Cw. Thus, it is possible to appropriately decide the target relative position Rt. Further, using the thus decided target relative position Rt for position control, it is possible to implement the same welding quality as the case where welding is executed by the welder.

In some other embodiments, as shown in FIG. 3B, the above-described target relative position decision unit 3 may include the second acquisition unit 3$a$ for acquiring at least one of the attitude information Ce of the electrode 82 or the shape information Cs of the welding object 9 (welded portion) of the condition included in the input condition C, and the third decision unit 3$b$ (position-based target decision unit 34) for deciding the target relative position Rt according to the input condition C from the welding feature amounts P such as the molten pool position Pm and the wire position Pw to be the inputs based on the relationship between previous welding feature amounts (to be referred to as previous welding feature amounts) such as the previous molten pool position and the previous wire position in welding performed under the previous input conditions including at least one of the attitude information Ce of the electrode 82 or the shape information Cs of the welding object 9 (welded portion) and welding condition Cw in the previous welding, and the previous relative position which is a relative position of the previous welding feature amounts.

The reason for thus configuring the target relative position decision unit 3 is that, as already described, the heat input condition (heat input state) in welding changes if the welding condition Cw changes, and thus the appropriate position of the position control object 8T such as the welding wire 8$w$ or the electrode changes in accordance with the input condition C. The welder recognizes, mainly based on visual information on the welded state which varies in accordance with the input condition C, the welding feature amount P (such as the wire position Pw, the molten pool position Pm, the electrode position Pe, or the groove position Pb) for ensuring welding quality, and operates the wire position Pw, the electrode 82, or the like based on his/her experiences, thereby achieving high-quality welding. Under such findings, the present inventors consider that the difference by the input condition C is reflected on the operation performed by the welder, and the target relative position Rt can be obtained from an operation history of the welder in place of the input condition C.

In the embodiment shown in FIG. 3B, the target relative position decision unit 3 decides the target relative position Rt according to the input condition C from the above-described welding feature amount P and at least one of the attitude information Ce of the electrode 82 or the shape information Cs of the welding object 9, by using the learning model M (position-based learning model) which is obtained by machine learning of the learning data Md associating the above-described previous welding feature amount, at least one of the attitude information Ce of the electrode 82 or the shape information Cs of the welding object 9, and the above-described previous relative position with each other.

The position-based learning model may be the learning model M which is obtained by machine learning of the learning data Md associating the above-described previous welding feature amount with the above-described previous relative position. The learning data Md in this case can be learned by setting the attitude information Ce of the electrode and the shape information Cs of the welding object 9 as explanatory variables, and the target relative position decision unit 3 can accurately decide the target relative position Rt with respect to the welding object 9.

According to the above configuration, a relationship between a record of the welding feature amounts P, such as the position of the molten pool 8*m* and the position of the welding wire 8*w* obtained as a result of operating the position control object 8T such as the welding wire 8*w* by the welder in the past, and a record of a relative position obtained from the result is learned and based on the learning result, the target relative position Rt is obtained from the welding feature amounts P such as the position of the molten pool 8*m* and the position of the welding wire 8*w*. Thus, it is possible to appropriately decide the target relative position Rt. Further, it is possible to easily address the unexperienced input condition C. For example, if a tendency, such as the target relative position Rt of the welding wire 8*w* to the molten pool 8*m* is in a linear relationship, is found from large amounts of data (learning data), the input condition C that has not yet been experienced but close to the condition experienced in the past and a condition interpolated in a plurality of data fall into the category of linear modelization, and thus can be addressed. Further, using the thus decided target relative position Rt for position control, it is possible to implement the same welding quality as the case where welding is executed by the welder.

However, the present invention is not limited to the above-described two embodiments. In some other embodiments, when the target relative position Rt according to the input condition C during welding is decided by using the above-described learning model M, not less than two learning models M may be used for the decision. More specifically, a first learning model for obtaining the target relative position Rt (temporary target relative position) according to the welding condition Cw is created therefrom, and a second learning model for obtaining, from at least one of the attitude information Ce of the electrode 82 or the shape information Cs of the welding object 9 (welded portion), a correction amount of the temporary target relative position according thereto. Then, the final target relative position Rt of the position control object 8T may be decided by correcting the temporary target relative position obtained by the first learning model with the correction amount obtained by the second learning model.

In some other embodiments, a target value conversion means such as a function or a table for presetting the target relative position Rt according to the input condition C in consideration of the welding condition Cw (heat input condition) or the like is created, and the target relative position decision unit 3 may decide the target relative position Rt from the input condition C by using the target value conversion means. More specifically, the target relative position decision unit 3 may decide the target relative position Rt from the input condition C by using the target value conversion means for obtaining the target relative position Rt corresponding to the input condition C from the input condition C created by using the above-described condition-based learning model. Alternatively, the target relative position decision unit 3 may decide the target relative position Rt from the welding feature amount P by using the target value conversion means for obtaining the target relative position Rt corresponding to the welding feature amount P from the welding feature amount P created by using the above-described position-based learning model. Thus, it is possible to calculate the target relative position Rt according to the input condition C while suppressing a calculation amount.

The case where the input condition C further includes the welding condition Cw in addition to at least one of the attitude information Ce of the electrode 82 or the shape information Cs of the welding object 9 has been described above. However, the above-described embodiments also hold in the case where the input condition C only includes the welding condition Cw.

Figure 8:
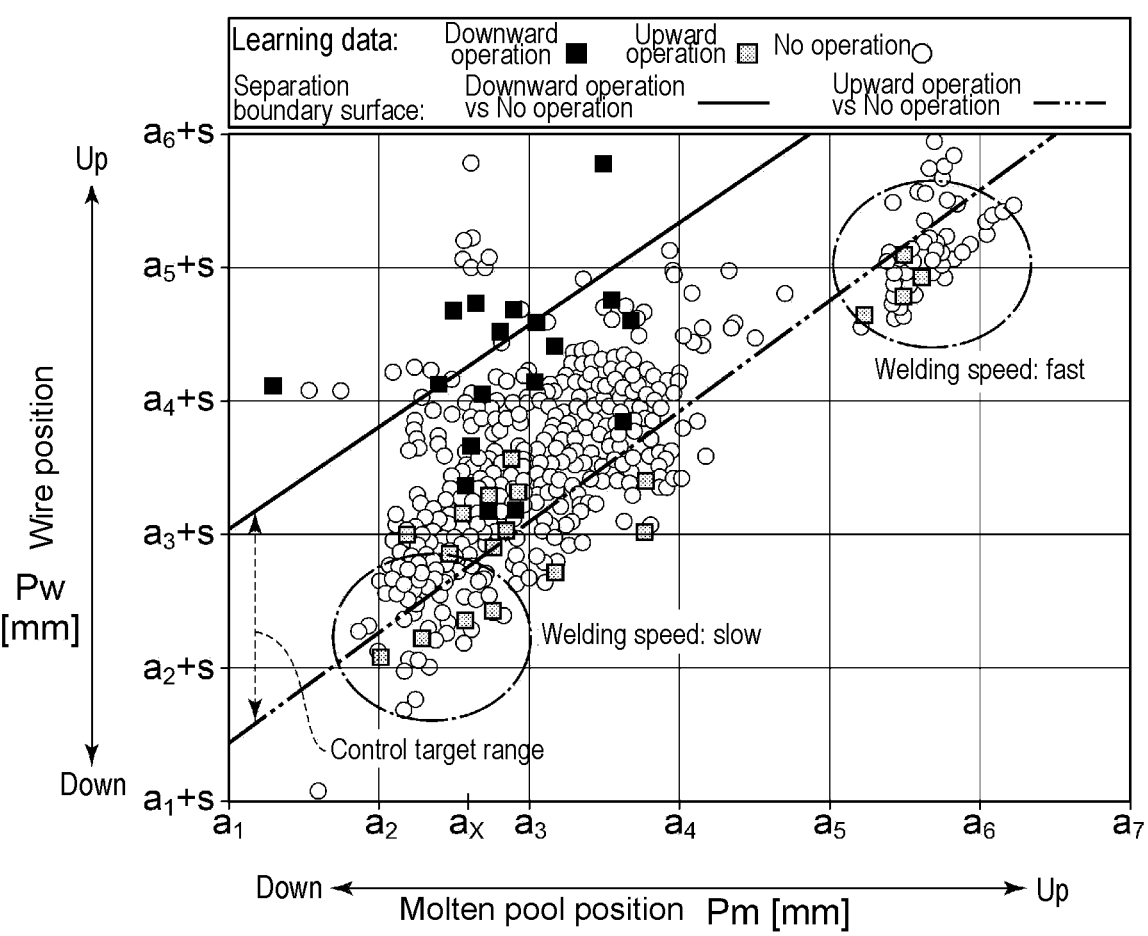
FIG. 8 is a graph showing a relationship among a molten pool position, a wire position, and an operation history by a welder according to an embodiment of the present invention.
Figure 9:
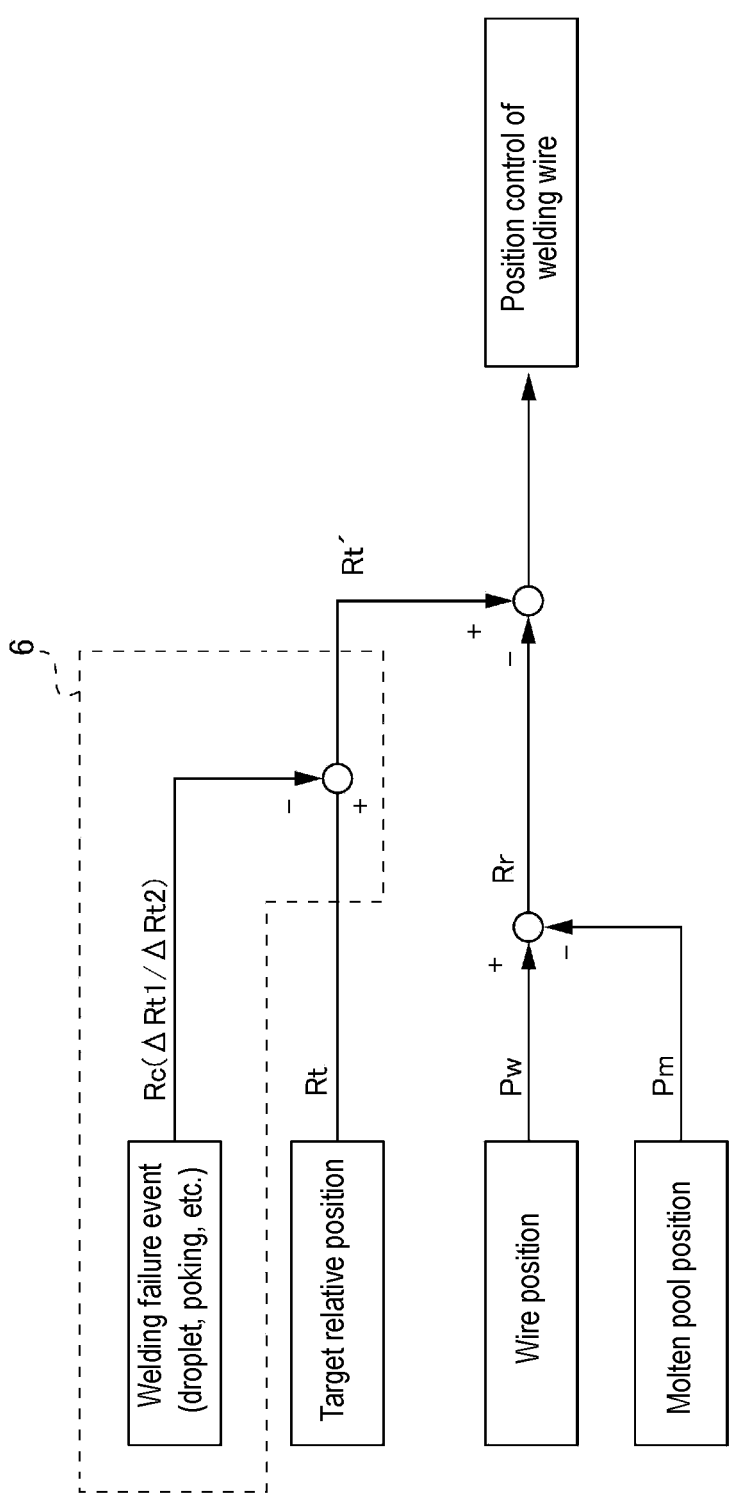
FIG. 9 is a diagram of a logic when a failure event of welding is detected according to an embodiment of the present invention.

Next, some other embodiments of the welding control device 1 will be described with reference to FIGS. 8, and 9. FIG. 8 is a graph showing a relationship among the molten pool position Pm, the wire position Pw, and the operation history by the welder according to an embodiment of the present invention. Further, FIG. 9 is a diagram of a logic when a failure event of welding is detected according to an embodiment of the present invention.

In some embodiments, the welding control device 1 may further include a second determination unit 4 (necessity determination unit) for determining the necessity of position control of the position control object 8T based on the difference between the target relative position Rt and the actual relative position Rr described above, as shown in FIGS. 3A and 3B. In this case, the above-described control unit 5 performs position control of the position control object 8T such as the welding wire 8*w* in accordance with a determination result by the second determination unit 4.

Describing the graph shown in FIG. 8, the abscissa indicates the molten pool position Pm, the ordinate indicates the wire position Pw, and the graph plots operation contents by the welder with respect to the molten pool position Pm and the wire position Pw. That is, FIG. 8 shows the operation performed by the welder in the combination of the molten pool position Pm and the wire position Pw. More specifically, a point plotted by a black square indicates that the welder performs an operation downward (downward operation), a point plotted by a light-colored square indicates that the welder performs an operation upward (upward operation), and a point plotted by a white circle indicates that the welder performs no operation. The molten pool position Pm and the wire position Pw of the graph shown in FIG. 8 are a relative position from an origin at the lower left end of the image V (see FIG. 2). However, the present invention is not limited to the present embodiment, and the origin of the coordinate can be an optional position.

In FIG. 8, a value of the ordinate is larger than a value of the abscissa by a constant S, and a dashed line is a line connecting points at which the wire position Pw is larger than the molten pool position Pm by the constant S. As indicated by the dashed line, for example, it can be seen that the position of the molten pool position Pm and the position the wire position Pw are different in accordance with whether the welding speed is fast or slow. Further, regarding the wire pool relative position (distance), if the welding speed is fast, the wire position Pw at the plot points (white circles) indicating no operation are concentrated below the dashed line, and the actual relative position Rr is shorter. Conversely, if the welding speed is slow, the wire position Pw at the plot points (white circles) indicating no operation are concentrated above the dashed line, and the actual relative position Rr is longer. Thus, it can be seen that the target relative position Rt changes in accordance with the input condition C (the welding condition Cw in FIG. 8).

As shown in FIG. 8, while the wire position Pw takes various values at the optional molten pool position Pm such as the molten pool position Pm is ax, there are a case where the welder performs the operation and the case where the welder does not perform the operation. Then, a tendency can be seen from FIG. 8 that at the molten pool position Pm, the welder does not perform the operation in a certain range of the wire position Pw, performs the downward operation if the wire position Pw increases over the range, and performs the upward operation if the wire position Pw goes below the range. That is, analyzing the welder's operation, if a difference (|Pw−Pm|) in the actual relative position Rr of the welding wire 8w to the molten pool 8m deviates from a predetermined range in welding, the welder performs, based on his/her experience, an operation for correcting the difference.

Thus, in a case where the difference between the target relative position Rt and the actual relative position Rr falls within the predetermined range, the second determination unit 4 does not perform position control of the welding wire 8w (a control dead zone is set) even if the difference is caused between the target relative position Rt and the actual relative position Rr. Thus, it is possible to execute the same welding as the welder with a small number of operations.

In some embodiments, the above-described predetermined range (the control dead zone as needed, hereinafter) may be set based on a plurality of operation history data which associates the previous welding feature amount with the presence or absence of the operation of the position control object 8T corresponding thereto, such as a plurality of operation history data which associates the previous molten pool position, the previous wire position, and the presence or absence of the operation of the previous wire position at that time in the previous welding with each other. In this case, the second determination unit 4 determines that position control of the position control object 8T such as the welding wire 8w is necessary, if the difference between the actual relative position Rr and the target relative position Rt described above deviates from the control dead zone (predetermined range) set as described above. Conversely, the second determination unit 4 determines that position control of the position control object 8T is unnecessary, if the above-described difference falls within the range of the control dead zone.

More specifically, for example, a classification model having the welding feature amount P as an input and a label for the presence or absence of the operation as an output is generated by a support vector machine (SVM), and regarding a feature amount space to be focused (a two-dimensional space of the molten pool position Pm and the wire position Pw in FIG. 8), a separation boundary surface between a space where an intervention operation by an operator is necessary (label: operation present) and a space where the operation is unnecessary (label: operation absent) is specified. The thus obtained lines are a solid line and a double-dotted chain line shown in FIG. 8. The solid line is a separation boundary between the presence of the downward operation and the absence of the operation, and the downward operation is present in a space above the solid line and is absent in a space below the solid line. On the other hand, the double-dotted chain line is a separation boundary between the presence of the upward operation and the absence of the operation, the upward operation is present in the space above the solid line, and the downward operation is absent in the space below the solid line. Then, a space between these two separation boundaries is the control dead zone where the operation is unnecessary.

In short, in FIG. 8, the downward operation is performed if the wire position Pw relative to the molten pool position Pm is above the solid line, the upward operation is performed if the wire position Pw relative to the molten pool position Pm is below the double-dotted chain line, and no operation is performed if the wire position Pw relative to the molten pool position Pm is between the solid line and the double-dotted chain line. In other words, the range between the solid line and the double-dotted chain line described above in each molten pool position Pm is the control dead zone, and the control dead zone is a control target range of the wire position Pw. The target relative position Rt calculated by the target relative position decision unit 3 falls within the control target range.

In the embodiments shown in FIGS. 3A and 3B, the second determination unit 4 is connected to the actual relative position decision unit 2 and the target relative position decision unit 3, receives the actual relative position Rr and the target relative position Rt, and receives the actual relative position Rr and the target relative position Rt from the actual relative position decision unit 2. Further, receiving the actual relative position Rr and the target relative position Rt, the second determination unit 4 does not perform position control of the wire position Pw even if there is the difference between the target relative position Rt and the actual relative position Rr, as long as the difference between the actual relative position Rr and the target relative position Rt is in the range of the control dead zone. Conversely, if the difference between the actual relative position Rr and the target relative position Rt deviates from the range of the control dead zone, the second determination unit 4 performs position control of the wire position Pw such that the difference falls within the range of the control dead zone.

The collected operation history data (learning data) has a small amount of data on the presence of the operation (such as the presence of the downward operation, the presence of the upward operation) relative to the absence of the operation. If there is such imbalance in the number of data, it is known that identification performance of SVM decreases greatly. Thus, in order to eliminate imbalance in the number of data, in the embodiment shown in FIG. 8, by performing class weighting based on the ratio of the number of data, a problem is resolved that a class where the operation is present which is small in the number of data is underevaluated.

According to the above configuration, the range for determining the necessity of execution of the position control of the welding wire $8w$ is decided based on the relationship between the presence or absence of the operation at the position of the welding wire $8w$ performed by the welder, and the previous molten pool position and the wire position. Thus, it is possible to appropriately set the above-described predetermined range, and to automatically execute the same welding as the welder with a small number of operations.

In the above-described embodiments, in some embodiments, the above-described predetermined range may be decided in accordance with the input condition C such as the welding condition Cw. That is, the control dead zone for determining the necessity of execution of position control of the welding wire $8w$ is variable in accordance with the input condition C or the welding feature amounts P such as the molten pool position Pm and the wire position Pw on which the input condition C is reflected. Thus, it is possible to set the above-described predetermined range (the range of the control dead zone) in accordance with the input condition C, and to appropriately address each of the input condition C where position control of the welding feature amount P such as the welding wire $8w$ needs to be performed strictly and the input condition C where the above-described position control need not be performed strictly.

In some other embodiments, the above-described predetermined range may be constant regardless of the input condition C.

Moreover, in some embodiments, the above-described actual relative position decision unit 2 may further include the first determination unit 23 (abnormality determination unit) for determining a detected abnormality in the welding feature amount P for each control cycle T described above by the detection unit 22 (to simply be referred to as a detected abnormality, hereinafter), as shown in FIGS. 3A and 3B. More specifically, in the normal control cycle Ts which is the control cycle T determined by the first determination unit 23 that the detected abnormality does not occur, the actual relative position decision unit 2 calculates the actual relative position Rr based on the welding feature amount P which is detected from the image V acquired in the normal control cycle Ts.

Figure 11:
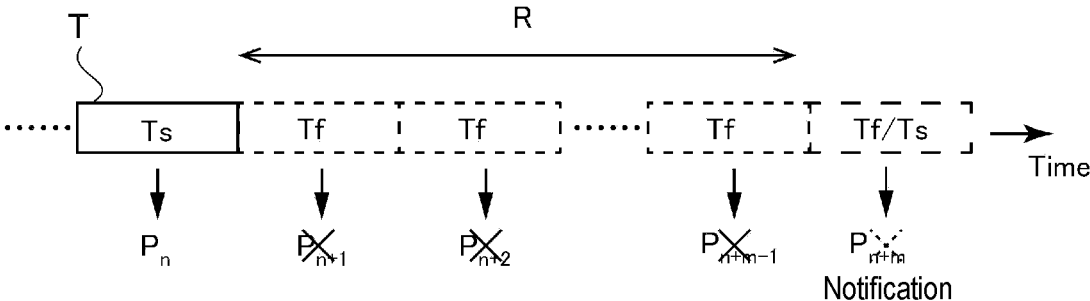
FIG. 11 is a view for describing the operation of the actual relative position decision unit in the abnormal control cycle according to an embodiment of the present invention and shows a case where the normal control cycle does not exist by the predetermined period before in the abnormal control cycle.

On the other hand, in some embodiments, as shown in FIG. 11 to be described later, in an abnormal control cycle Tf which is the control cycle T determined by the first determination unit 23 that the detected abnormality occurs, the actual relative position decision unit 2 may calculate the actual relative position Rr based on the welding feature amount P which is detected from the image V acquired in the normal control cycle Ts which has already been terminated before the abnormal control cycle Tf. That is, in the abnormal control cycle Tf, the actual relative position decision unit 2 may use the actual relative position Rr obtained in the normal control cycle Ts before the abnormal control cycle Tf.

The above-described detected abnormality is a case of an outlier such as a case where the welding feature amount P cannot be detected from the image V at all for each control cycle T through image processing by the detection unit 22, a case where the value of the welding feature amount P is unexpectedly and greatly changed from the prior value, or a case where the value of the welding feature amount P becomes a value which is impossible under normal circumferences. There can be a case where the welding feature amount P cannot appropriately be detected, such as the welding feature amount P cannot be detected or is erroneously detected by image processing, due to the fact that the image V becomes too dark if the heat input amount set by the welding condition Cw is too small and conversely, the image V becomes too bright if the heat input amount is too large, for example.

Then, in the present embodiment, in the abnormal control cycle Tf, control of welding is not immediately stopped, but the welding procedure is continued by using the actual relative position Rr which is obtained from the image V acquired in the normal control cycle Ts before the determination. This is because the detected abnormality in the welding feature amount P may temporarily be caused in accordance with the heat input amount in welding or the like and may recover naturally.

More specifically, in the abnormal control cycle Tf, it may be configured such that the welding feature amount P which is detected from the image V acquired in the normal control cycle Ts before the abnormal control cycle Tf is input to the calculation unit 24, or the actual relative position Rr from the image V acquired in the normal control cycle Ts before the abnormal control cycle Tf is output from the calculation unit 24. In the embodiments shown in FIGS. 3A and 3B, the first determination unit 23 determines the presence or absence of the detected abnormality based on a notification that the welding feature amount P input from the detection unit 22 cannot be detected or the value of the welding feature amount P. Then, the welding feature amount P input from the detection unit 22 is output to the calculation unit 24, if the first determination unit 23 determines that there is no detected abnormality.

Figure 10:
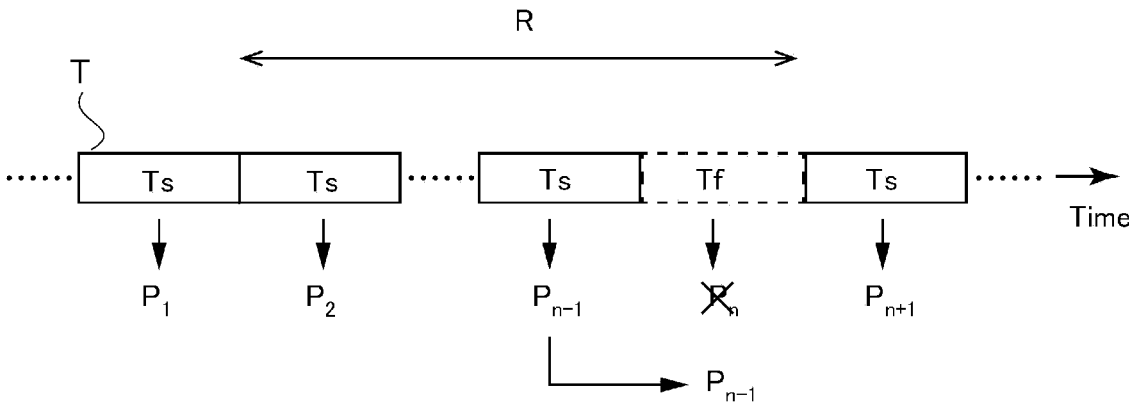
FIG. 10 is a view for describing an operation of an actual relative position decision unit in an abnormal control cycle according to an embodiment of the present invention and shows a case where a normal control cycle exists by a predetermined period before in the abnormal control cycle.

This will be described with reference to FIG. 10. FIG. 10 is a view for describing an operation of the actual relative position decision unit 2 in the abnormal control cycle Tf according to an embodiment of the present invention and shows a case where the normal control cycle Ts exists by a predetermined period R before in the abnormal control cycle Tf. FIG. 10 shows a state where each control cycle T is repeated with time, and the welding feature amount P (P1, P2, . . . , Pn−1, Pn+1, n is an integer) is detected from the image V acquired in each control cycle T.

Then, in the embodiment shown in FIG. 10, the control cycles T before and after the nth control cycle are the normal control cycles Ts, and the nth control cycle is the abnormal control cycle Tf. Thus, the actual relative position decision unit 2 (detection unit 22) cannot detect the welding feature amount P from the image V acquired in the nth control cycle T (abnormal control cycle Tf). Therefore, the actual relative position decision unit 2 uses the welding feature amount P detected from the image V in the normal control cycle Ts before (previous to) the nth abnormal control cycle Tf as a substitute for the welding feature amount P detected from the image V in the nth abnormal control cycle Tf.

For example, in each abnormal control cycle Tf, if the normal control cycle Ts does not exist in the period by the predetermined period R, which is set in accordance with the welding feature amount P, before the abnormal control cycle Tf, the actual relative position decision unit 2 may be configured not to decide the actual relative position Rr in the abnormal control cycle Tf. In other words, the notification may be made if a period until the first normal control cycle Ts after the abnormal control cycle Tf exceeds the predetermined period R. Alternatively, the first determination unit 23 may make a notification to be described later.

Further, for example, in FIG. 10, if the (n−1)th control cycle is also the abnormal control cycle Tf, the welding feature amount P in the (n−2)th normal control cycle Ts may be substituted. Furthermore, although the welding feature amount P in the (n−1)th (immediately preceding) normal control cycle Ts is substituted in FIG. 10, the welding feature amount P can be the welding feature amount P in the normal control cycle Ts included in the above-described predetermined period R.

In the embodiments shown in FIGS. 1A to 3B, during one cycle of the control cycle T in which the above-described detection unit 22 detects the welding feature amount P, the first acquisition unit 21 acquires the plurality of images V, and the acquired images V are accumulated in the storage device m or the like. Then, the detection unit 22 detects the welding feature amount P from the plurality of images V accumulated for each control cycle T, and if the welding feature amount P of interest cannot be detected from the plurality of images V at all (there is no valid data), it is determined that the above-described detected abnormality occurs. Thus, a processing load by performing a process for position control for each image is reduced while appropriately performing position control of the position control object 8T. In the present embodiment, regarding one position such as the wire position Pw in the normal control cycle Ts, if a plurality of values are detected from the plurality of images V, a value which is considered the most appropriate as the reference of control, for example, a value detected from the image V which is the latest in one cycle of the normal control cycle Ts among the images V where the position is detected appropriately may be used, as the welding feature amount P, for subsequent calculation of the actual relative position Rr.

However, the present invention is not limited to the embodiments shown in FIGS. 1A to 3B and in some other embodiments, the first acquisition unit 21 may acquire one image V during one cycle of the above-described control cycle T. In this case, if the detection unit 22 cannot detect the welding feature amount P of interest from the one image V obtained for each control cycle T, it is determined that the above-described detected abnormality is determined.

According to the above configuration, if the welding feature amount P from the image V is not appropriately detected, the actual relative position Rr on the basis of the image V determined that the detected abnormality does not occur is used by, for example, calculating the actual relative position Rr by using, as a substitute, the welding feature amount P (substitute feature amount) which is detected from the image V acquired in the immediately preceding normal control cycle Ts or the like. Thereby, it is possible to continuously execute welding. Further, it is possible to prevent a situation where welding is controlled based on the welding feature amount P in which the detected abnormality occurs, prevent damage to the welding object 9 and the welding execution device 8, and improve reliability of the welding control device 1.

In some other embodiments, the actual relative position decision unit 2 may be configured not to control the position control object 8T, for example, by not outputting the actual relative position Rr to the calculation unit 24 in the abnormal control cycle Tf. That is, in the abnormal control cycle Tf, by continuing the welding procedure without controlling the position control object 8T based on the actual relative position Rr and the target relative position Rt of the position control object 8T, natural recovery of the detected abnormality in the welding feature amount P may simply be waited. Then, a notification may be made in a case where the normal control cycle Ts is not obtained even if the predetermined period R passes.

In the embodiments related to the above-described detected abnormality, in some embodiments, as shown in FIGS. 3A and 3B, the above-described first determination unit 23 makes a notification if the period until the first normal control cycle Ts after the abnormal control cycle Tf exceeds the predetermined period R which is set in accordance with the position control object 8T such as the welding wire 8w (see FIG. 11). That is, the first determination unit 23 makes the notification that it is necessary to determine whether welding is continuable, if the detected abnormality in the welding feature amount P from the image V is continued over the predetermined period R. The notification gives notice of the detected abnormality in the welding feature amount P. For example, the notification may be directed to the operator or the like, may be an output of an abnormality notification message to a display or the like, or may be a notification by sound or voice. The first determination unit 23 may automatically transmit an instruction to stop welding to the welding execution device 8, together with the notification.

This will be described with reference to FIG. 11. FIG. 11 is a view for describing the operation of the actual relative position decision unit 2 in the abnormal control cycle Tf according to an embodiment of the present invention and shows a case where the normal control cycle Ts does not exist by the predetermined period R before in the abnormal control cycle Tf. In the embodiment shown in FIG. 11, the (Pn−1)th control cycle T is the normal control cycles Ts, and the control cycles T thereafter (the Pnth to the (Pn+m−1)th) are the abnormal control cycles Tf. In this case, the actual relative position decision unit 2 (detection unit 22) cannot detect the welding feature amount P from the images V acquired in the nth to the (n+m−1)th abnormal control cycles Tf. Further, the (n+m)th control cycle T exceeds the above-described predetermined period R, even if the (n+m)th control cycle T is either the normal control cycle Ts or the abnormal control cycle Tf. Thus, the first determination unit 23 makes the above-described notification after the end of the (n+m−1)th control cycle T. In addition, the first determination unit 23 may transmit the instruction to stop welding described above, together with the notification. In the (Pn+1)th to the (Pn+m−1)th abnormal control cycles Tf of FIG. 11, the welding feature amount P in the previous normal control cycle Ts may be substituted, as described above.

Although the welding feature amount P changes with time, even if the welding feature amount P changes, the above-described predetermined period R is a period capable of continuing welding without control, and the notification is made after a lapse of the period. Thereby, it is possible to improve reliability of welding while continuing welding as much as possible.

Further, for example, the shape of the groove (the wall of the welding object 9) rarely changes rapidly, and thus the electrode 82 has a relatively long period during which welding is likely to be continuable without control, whereas the position of the welding wire 8w, which is wound by the reel and is used while being drawn out, may change rapidly, easily changes from the position in the image V immediately before detected abnormality, and thus has a relatively short period during which welding is likely to be continuable without control. Thus, setting the above-described predetermined period R in accordance with the welding feature amount P, it is possible to continue welding which is suitable when abnormalities are detected in various feature amounts included in the welding feature amounts P.

Further, in some embodiments, as shown in FIGS. 3A, 3B, and 9, the welding control device 1 may further include a second correction unit 6 for correcting the target relative position Rt decided by the target relative position decision unit 3, if a failure event of welding is detected. In the embodiment shown in FIG. 9, before the target relative position Rt output by the target relative position decision unit 3 is input to the second determination unit 4, the target relative position Rt is corrected by a target position correction amount Rc which is output when the second correction unit 6 detects the failure event of welding. If the second correction unit 6 corrects the target relative position Rt, the corrected target relative position Rt' and the actual relative position Rr are input to the second determination unit 4.

Further, the above-described failure event of welding is an event of, for example, a droplet which is generated when the tip of the welding wire 8w is not in the molten pool 8m, or poking in which the tip of the welding wire 8w hits the welding object 9 which is the bottom of the molten pool 8m. The droplet is a ball-shaped metal of liquid phase obtained by melting the welding wire 8w which falls into the molten pool 8m due to the fact that the tip of the welding wire 8w floats upward because of a warping habit or the like thereof and the tip of the welding wire 8w is melted by arc heat in a state where the tip of the welding wire 8w is not inserted into the molten pool 8m. For example, by detecting the droplet through image processing on the image V, it is possible to detect the state where the tip of the welding wire 8w floats above the molten pool 8m. If the tip of the welding wire 8w floats above the molten pool 8m because of the warping habit or the like thereof, the welding wire 8w is not completely melted and may collide with the electrode 82. If the welding wire 8w collides with the electrode 82, the electrode 82 and the welding wire 8w are short-circuited, which may interrupt arc discharge or may break the electrode 82.

Thus, in occurrence of the droplet which is generated when the tip of the welding wire 8w is not in the molten pool 8m, it is necessary to bring the tip of the welding wire 8w and the molten pool 8m into contact with each other, requiring downward movement. A movement amount needed at this time will be denoted by ΔRt1. Further, if poking occurs in which the tip of the welding wire 8w hits the welding object 9 which is the bottom of the molten pool 8m, upward movement is necessary to avoid the hit. A movement amount needed at this time will be denoted by ΔRt2.

Then, if position control of the welding wire 8w when such failure event of welding is detected and position control of the welding wire 8w for the actual relative position Rr to become the target relative position Rt described above are performed separately, control hunting may be caused as a result of performing control in an opposite direction to each other, such as one performs downward control and the other performs upward control.

Thus, as shown in FIG. 9, in accordance with the presence or absence of the failure event of welding, by correcting the target relative position Rt based on the movement amount ΔRt1 or the movement amount ΔRt2, it is possible to avoid occurrence of the above-described hunting.

Figure 12:
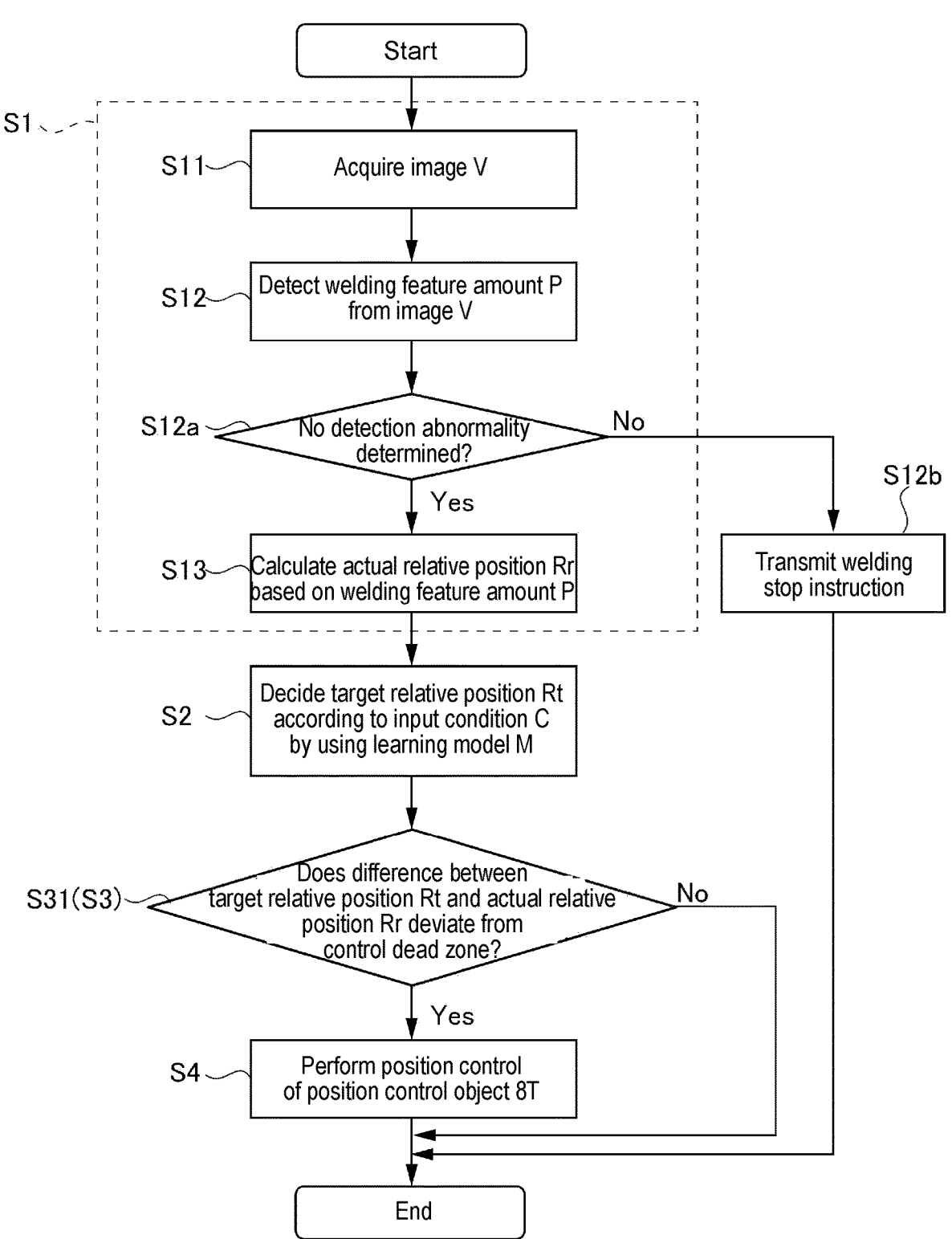
FIG. 12 is a flowchart of a welding control method according to an embodiment of the present invention.

A welding control method corresponding to the above-described welding control device 1 (welding control program) will be described below with reference to FIG. 12. FIG. 12 is a flowchart of a welding control method according to an embodiment of the present invention.

The welding control method is a method for controlling the position of the position control object 8T which includes at least one of the welding wire 8w used to weld the welding object 9 or the electrode 82 for melting the welding wire 8w. As shown in FIG. 12, the welding control method includes a step (S1) of deciding the actual relative position Rr, a step (S2) of deciding the target relative position Rt, and a step (S4) of controlling the position of the position control object 8T. Further, as shown in FIG. 12, the welding control method may include a step (S3) of determining the necessity of position control of the position control object 8T. The welding control method will be described in order of steps with reference to FIG. 12. The flow of FIG. 12 is repeated, for example, periodically in the welding procedure.

In step S1 of FIG. 12, the above-described actual relative position Rr is decided based on the image V. Step S1 is the same as the processing contents performed by the actual relative position decision unit 2 (first decision unit) that have already been described, and thus details of which are to be omitted. In the embodiment shown in FIG. 12, step S11 includes acquiring the image V from the shooting part 83 described above, step S12 includes detecting the above-described welding feature amount P from the image V, and step S13 includes calculating the above-described actual relative position Rr based on the welding feature amount P.

At this time, in some embodiments, the welding control method may further include a step (S12a) of determining a detected abnormality in the welding feature amount P by step S12 described above. Step S14 is the same as the processing contents performed by the first determination unit 23 that have already been described, and thus details of which are to be omitted. In the embodiment shown in FIG. 12, step S12a following step S12 includes determining the detected abnormality, and if it is determined that there is no detected abnormality, step S13 is performed. Conversely, if it is determined in step S12a that there is the detected abnormality, step S12b includes automatically transmitting an instruction to stop welding to the welding execution device 8.

Step S2 includes deciding the target relative position Rt. Step S2 is the same as the processing contents performed by the target relative position decision unit 3 (second decision unit) that have already been described, and thus details of which are to be omitted. In the embodiment shown in FIG. 12, the target relative position Rt is decided based on the learning model M created by the above-described machine learning method.

Step S3 includes determining the necessity of position control of the position control object 8T based on the difference between the target relative position Rt and the actual relative position Rr. Step S3 is the same as the processing contents performed by the second determination unit 4 that have already been described, and thus details of which are to be omitted. In the embodiment shown in FIG. 12, step S31 includes determining whether the difference between the target relative position Rt and the actual relative position Rr deviates from the above-described control dead zone, and if it is determined that the above-described difference deviates from the control dead zone, position control of the position control object 8T is determined as necessary, advancing the flow to next step S4. Conversely, if it is determined in step S31 that the difference between the target relative position Rt and the actual relative position Rr does not deviate from the control dead zone, position control of the position control object 8T is determined as unnecessary, terminating the flow.

Step S4 includes performing position control of the position control object 8T, and setting the actual relative position Rr of the position control object 8T decided in step S1 to the target relative position Rt decided in step S2. Step S4 is the same as the processing contents performed by the control unit 5 that have already been described, and thus details of which are to be omitted.

Further, in some embodiments, the above-described welding control method may further include a step of correcting the target relative position Rt decided by the step (S2) of deciding the target relative position Rt described above, if the failure event of welding is detected. The above-described step is the same as the processing contents performed by the second correction unit 6 that have already been described, and thus details of which are to be omitted. The step of correcting the target relative position Rt is preferably performed between step S2 and step S3 of FIG. 12 (see FIG. 9).

The present invention is not limited to the above-described embodiments, and also includes an embodiment obtained by modifying the above-described embodiments and an embodiment obtained by combining these embodiments as appropriate.

REFERENCE SIGNS LIST

1 Welding control device
m Storage device
10 Welding control program
2 Actual relative position decision unit (first decision unit)
21 First acquisition unit
22 Detection unit
22c First correction unit
23 First determination unit (abnormality determination unit)
24 Calculation unit
3 Target relative position decision unit (second decision unit)
3a Second acquisition unit
3b Third decision unit
32 Condition-based target decision unit (third decision unit)
34 Position-based target decision unit (third decision unit)
4 Second determination unit (necessity determination unit)
5 Control unit
6 Second correction unit
7 Welding device
8 Welding execution device
8T Position control object
8m Molten pool
81 Wire feed mechanism
82 Electrode
82c Attitude control mechanism
82t Torch
83 Shooting part
8w Welding wire
9 Welding object
91 Groove
V Image
C Input condition
Ce Attitude information
$\theta$t Torch angle
$\theta$d Inclination angle
$\theta$r Roll angle
Cs Shape information
Cw Welding condition
P Welding feature amount
Pb Groove position
Pb' Groove position (corrected)
Pe Electrode position
Pm Molten pool position
Pw Wire position
Rr Actual relative position
Rt Target relative position Rc Target position correction amount
M Learning model
Md Learning data
L Groove width
Lw Weaving width
Ll Left distance
Lr Right distance
R Predetermined period
S Constant
T Control cycle
Tf Abnormal control cycle
Ts Normal control cycle

The invention claimed is:

1. A welding control device configured to control a position control object which includes at least one of a welding wire used to weld a welding object or an electrode for melting the welding wire, the device comprising:

a processor; and
a non-transitory memory having stored thereon executable instructions, which when executed, cause the processor to perform:

deciding an actual position of the position control object based on a welding feature amount detected from an image which is shot to include at least the position control object, the welding feature amount including at least one of a wire position of the welding wire or an electrode position of the electrode;

acquiring an input condition which includes attitude information of the electrode when the welding object is welded, the attitude information including information on at least one of a torch angle, an inclination angle, or a roll angle for setting an attitude of the electrode;

deciding, based on the input condition, a target position which is a target of the actual position according to the input condition; and controlling a position of the position control object so that the actual position becomes the target position, wherein the processor is configured to decide the target position in a current welding cycle according to the input condition based on a relationship between a previous input condition from a previous welding cycle performed before the current welding cycle and a previous position which is the actual position set under the previous input condition.

2. The welding control device according to claim 1, wherein the image further includes at least one of a groove of the welding object or a molten pool formed in the groove by melting the welding wire, wherein the welding feature amount further includes at least one of a groove position of the groove or a molten pool position of the molten pool, wherein the actual position includes an actual relative position which is a relative position of at least one of the wire position or the electrode position to the another welding feature amount, and wherein the target position includes a target relative position which is a target of the relative position according to the input condition when the welding object is welded.

3. The welding control device according to claim 1, wherein the processor decides the target position according to the input condition by using a learning model which is obtained by machine learning of a plurality of data associating the previous input condition with the previous position set under the previous input condition.

4. The welding control device according to claim 3, wherein the input condition further includes shape information of the welding object and a welding condition when the welding object is welded, wherein the learning model includes a first learning model for obtaining a temporary target position according to the welding condition, and a second learning model for obtaining a correction amount for correcting the temporary target position according to at least one of the attitude information of the electrode or the shape information of the welding object, and wherein the processor decides the target position based on the temporary target position and the correction amount.

5. The welding control device according to claim 1, wherein the position control object includes the electrode, wherein the input condition further included shape information of the welding object, wherein the shape information of the welding object includes a groove width of the welding object, and wherein the processor decides the target position of the electrode based on at least the groove width.

6. The welding control device according to claim 5, wherein the processor estimates the groove width based on the image and a weaving width of the electrode, and the processor decides the target position of the electrode based on the estimated groove width.

7. The welding control device according to claim 1, wherein the processor corrects the welding feature amount based on the attitude information of the electrode, and wherein the processor decides the actual position based on the corrected welding feature amount.

8. The welding control device according to claim 7, wherein the image further includes a groove of the welding object, wherein the welding feature amount further includes a groove position of the groove, wherein a shooting part for shooting the image sets a shooting direction to shoot the welding object in accordance with an attitude of the electrode, and wherein the processor corrects the groove position based on the attitude information of the electrode, and the processor decides the actual position based on the welding feature amount including the corrected groove position.

9. The welding control device according to claim 8, wherein the attitude information includes a roll angle for setting the attitude of the electrode, and wherein the processor corrects the groove position detected from the image, based on a relation of x=y× tan(θr), where θr is the roll angle, y is a length along a welding direction between a predetermined position and the groove position detected from the image, and x is a length in a direction orthogonal to the welding direction between the predetermined position and the groove position detected from the image.

10. The welding control device according to claim 1, wherein the input condition further includes a welding condition when the welding object is welded.

11. The welding control device according to claim 10, wherein the welding condition includes at least one condition of an electrode current, an electrode voltage, a welding speed, a supply amount of the welding wire per unit time, or a groove width.

12. The welding control device according to claim 1, wherein the processor acquires the image from a shooting part for shooting the image, wherein the processor detects the welding feature amount from the image for each predetermined control cycle, and wherein the processor calculates the actual position based on the welding feature amount.

13. The welding control device according to claim 12, wherein the processor determines a detected abnormality in the welding feature amount for each control cycle, wherein, in a normal control cycle which is the control cycle determined that the detected abnormality does not occur, the processor calculates the actual position based on the welding feature amount which is detected from the image acquired in the normal control cycle, and wherein, in an abnormal control cycle which is the control cycle determined that the detected abnormality occurs, the processor calculates the actual position based on the welding feature amount which is detected from the image acquired in the normal control cycle before the abnormal control cycle.

14. The welding control device according to claim 12, wherein the processor determines a detected abnormality in the welding feature amount for each control cycle, and wherein the processor stops controlling the position control object in the abnormal control cycle which is the control cycle determined that the detected abnormality occurs.

15. The welding control device according to claim 1, wherein the processor corrects the decided target position, if a failure event of the welding is detected.

16. A welding control method configured to control a position control object which includes at least one of a welding wire used to weld a welding object or an electrode for melting the welding wire, the method comprising:

deciding an actual position of the position control object based on a welding feature amount detected from an image which is shot to include at least the position control object, the welding feature amount including at least one of a wire position of the welding wire or an electrode position of the electrode;

acquiring an input condition which includes attitude information of the electrode when the welding object is welded, the attitude information including information on at least one of a torch angle, an inclination angle, or a roll angle for setting an attitude of the electrode;

deciding a target position which is a target of the actual position according to the input condition;

controlling a position of the position control object so that the actual position becomes the target position, wherein the welding control method decides the target position in a current welding cycle according to the input condition based on a relationship between a previous input condition from a previous welding cycle performed before the current welding cycle and a previous position which is the actual position set under the previous input condition.

17. A non-transitory computer-readable storage medium storing a welding control program configured to control a position control object which includes at least one of a welding wire used to weld a welding object or an electrode for melting the welding wire, the program causing a computer to perform a method comprising:

deciding an actual position of the position control object based on a welding feature amount detected from an image which is shot to include at least the position control object, the welding feature amount including at least one of a wire position of the welding wire or an electrode position of the electrode; 5 acquiring an input condition which includes attitude information of the electrode when the welding object is welded, the attitude information including information on at least one of a torch angle, an inclination angle, or a roll angle for setting an attitude of the electrode; 10 deciding, based on the input condition, a target position which is a target of the actual position according to the input condition; and controlling a position of the position control object so that the actual position becomes the target position, 15 wherein the welding control program causes the computer to decide the target position in a current welding cycle according to the input condition based on a relationship between a previous input condition from a previous welding cycle performed before the current welding cycle and a previous position which is the actual position set under the previous input condition. 20

* * * * *